US012079348B1

(12) United States Patent
Stone et al.

(10) Patent No.: US 12,079,348 B1
(45) Date of Patent: *Sep. 3, 2024

(54) RISK RATING METHOD AND SYSTEM

(71) Applicant: Clearwater Compliance LLC, Hendersonville, TN (US)

(72) Inventors: Jonathan D. Stone, Nashville, TN (US); Tess Array Miller, DPO, AA (US); Ravneet Singh, State College, PA (US); Jonathan A. Moore, Hendersonville, TN (US)

(73) Assignee: CLEARWATER COMPLIANCE LLC, Hendersonville, TN (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/101,225

(22) Filed: Jan. 25, 2023

Related U.S. Application Data

(63) Continuation of application No. 17/722,725, filed on Apr. 18, 2022, now Pat. No. 11,620,390.

(51) Int. Cl.
*G06F 21/57* (2013.01)

(52) U.S. Cl.
CPC ...... *G06F 21/577* (2013.01); *G06F 2221/034* (2013.01)

(58) Field of Classification Search
CPC .......... G06F 21/577; G06F 2221/034
See application file for complete search history.

(56) References Cited

U.S. PATENT DOCUMENTS

| 4,887,731 A | 12/1989 | Pett et al. |
| 6,357,366 B1 | 3/2002 | Frankenberg |
| 7,124,101 B1 | 10/2006 | Mikurak |
| 7,607,542 B1 | 10/2009 | Hsieh |
| 8,020,210 B2 | 9/2011 | Tippett et al. |
| D672,960 S | 12/2012 | Turner |
| 8,434,618 B2 | 5/2013 | Mitchell et al. |

(Continued)

FOREIGN PATENT DOCUMENTS

| DE | 19802307 C2 | 2/2000 |
| GB | 2477328 A | 8/2011 |

(Continued)

OTHER PUBLICATIONS

Akinrolabu et al.; "Cyber risk assessment in cloud provider environments: Current models and future needs", 2019, Elsevier, pp. 1-18. (Year: 2019).*

(Continued)

*Primary Examiner* — Matthew Smithers
(74) *Attorney, Agent, or Firm* — Wyatt, Tarrant & Combs, LLP; Max E. Bridges; Matthew A. Williams

(57) ABSTRACT

A risk rating method and system that predicts the risk likelihood, the risk impact, and the risk rating of certain threats and vulnerabilities from exploiting different component groups. In some embodiments, the system's predictions (also referred to herein as inferences) are generated based on data elements provided by a user about its organization's information systems. In further embodiments, the method and system utilizes data mining, historical records, and an AI Engine to provide the predictions for the risk likelihood, the risk impact, and the risk rating posed by the various threat occurrences.

14 Claims, 12 Drawing Sheets

(56) References Cited

U.S. PATENT DOCUMENTS

| | | | |
|---|---|---|---|
| 8,950,612 | B2 | 2/2015 | Turner |
| 10,496,827 | B1 | 12/2019 | Ridner et al. |
| 10,708,291 | B2 | 7/2020 | Findlay |
| 11,552,984 | B2 * | 1/2023 | Kras .................. H04L 63/1483 |
| 11,620,390 | B1 * | 4/2023 | Stone .................... G06F 21/577 |
| | | | 726/25 |
| 2004/0006704 | A1 | 1/2004 | Dahlstrom et al. |
| 2005/0065807 | A1 | 3/2005 | Deangelis et al. |
| 2005/0086090 | A1 | 4/2005 | Abrahams et al. |
| 2005/0114829 | A1 | 5/2005 | Robin et al. |
| 2006/0218639 | A1 | 9/2006 | Newman et al. |
| 2008/0082348 | A1 | 4/2008 | Paulus et al. |
| 2008/0082380 | A1 | 4/2008 | Stephenson |
| 2009/0070253 | A1 | 3/2009 | Gavin |
| 2009/0127158 | A1 | 5/2009 | Apps |
| 2009/0228316 | A1 | 9/2009 | Foley et al. |
| 2010/0275263 | A1 | 10/2010 | Bennett et al. |
| 2011/0001605 | A1 | 1/2011 | Kiani et al. |
| 2011/0214091 | A1 | 9/2011 | Nicol et al. |
| 2012/0180133 | A1 | 7/2012 | Al-Harbi et al. |
| 2012/0185945 | A1 | 7/2012 | Andres et al. |
| 2012/0221485 | A1 | 8/2012 | Leidner et al. |
| 2012/0221486 | A1 | 8/2012 | Leidner et al. |
| 2015/0227868 | A1 * | 8/2015 | Saraf .................. G06Q 10/0635 |
| | | | 705/7.28 |
| 2015/0288712 | A1 | 10/2015 | Jones et al. |
| 2016/0012926 | A1 | 1/2016 | Lehnert et al. |
| 2016/0288951 | A1 | 10/2016 | Rader et al. |
| 2017/0048266 | A1 | 2/2017 | Hovor et al. |
| 2018/0020021 | A1 | 1/2018 | Gilmore et al. |
| 2019/0005423 | A1 | 1/2019 | Pritzkau et al. |
| 2019/0096214 | A1 | 3/2019 | Pourmohammad |
| 2019/0166149 | A1 | 5/2019 | Gerrick |
| 2019/0203459 | A1 | 7/2019 | Fogg et al. |
| 2020/0389481 | A1 | 12/2020 | Evans |
| 2021/0056213 | A1 | 2/2021 | Lucy et al. |
| 2021/0201229 | A1 | 7/2021 | Moon et al. |
| 2021/0216928 | A1 | 7/2021 | O'Toole et al. |
| 2021/0273961 | A1 * | 9/2021 | Humphrey .......... H04L 63/1416 |
| 2021/0279804 | A1 * | 9/2021 | Shakfeh ................ G16H 50/20 |
| 2022/0060497 | A1 | 2/2022 | Crabtree et al. |

FOREIGN PATENT DOCUMENTS

| | | | |
|---|---|---|---|
| WO | WO2012085941 | A1 | 6/2012 |
| WO | WO2012088297 | A1 | 6/2012 |
| WO | 2017210738 | A1 | 12/2017 |
| WO | 2021160499 | A1 | 8/2021 |

OTHER PUBLICATIONS

Creating a Threat Profile for Your Organization by Stephen Irwin, Sans Institute; Sep. 8, 2014; pp. 32 (Year: 2014).

Guidance on Risk Analysis Requirements under the HIPAA Security Rule; U.S. Department of Health and Human Services, Office for Civil Rights; Jul. 14, 2010; https://www.hhs.gov/sites/default/files/ocr/privacy/hipaa/administrative/securityrule/rafinalguidancepdf.pdf.

Advancing Cyber Risk Analysis: The Power of Prediction; https://clearwatercompliance.com/on-demand-videos/advancing-cyber-risk-analysis-the-power-of-prediction-on-demand/; Apr. 22, 2021.

(IPL) Macro, Macro Plastics, Inc.; Hybrid 1012; product guide; pp. 1-6; accessed from website Jun. 29, 2021; https://www.macroplastics.com/product/hybrid-1012/.

(IPL) Macro, Macro Plastics; Macroplastics Assembly and Disassembly of the Hybrid 1012; YouTube video; https://www.youtube.com/watch?v=VD67X-pbj3w&feature=emb_title.

The United States Patent and Trademark Office; The International Search Report and the Written Opinion of the international Searching Authority, or the Declaration of PCT/US21/31951; Oct. 15, 2021; pp. 1-13; The United States Patent and Trademark Office (as Searching Authority): US.

* cited by examiner

RISK RATING METHOD AND SYSTEM

CROSS-REFERENCE TO RELATED APPLICATION

This continuation patent application claims the benefit and priority to U.S. Nonprovisional patent application Ser. No. 17/722,725, filed on Apr. 18, 2022, the contents of which are fully incorporated by reference.

FIELD OF INVENTION

The embodiments described herein relate to determining the risk of certain threats impacting an organization's information systems, particularly those systems that store sensitive information. Based on the attributes, characteristics, and controls of an organization's system, the risk rating method and system, according to multiple embodiments and alternatives, recommends and predicts the likelihood, the impact, and the level of risk posed by a threat occurrence(s). In doing so, the embodiments herein provide more accurate, efficient, robust, and improved risk rating analyses.

BACKGROUND

As the world becomes more digitized and interconnected, individuals, businesses, governments, and others face increasing threats from cyberattacks. In recent years, both the costs and the severity of cyberattacks continues to grow at an alarming rate. For example, some reports suggest that the global cost of cybercrime grew from $3 trillion in 2015 to $6 trillion in 2021. Reports also suggest that cyberattacks are becoming progressively destructive and are targeting a wider array of information.

In the United States and other nations, certain entities (especially those that create, receive, maintain, and transmit protected health information ("PHI") and/or electronic protected health information ("ePHI"), as non-limiting examples) are required by law to conduct security risk analyses. For example, the U.S. Department of Health and Human Services has promulgated regulations that require covered entities and business associates to implement policies and procedures to prevent, detect, contain, and correct security violations of protected health information. 45 § CFR 164.308(a)(1)(i). To implement these security policies and procedures, the federal regulations require certain entities to undertake a risk analysis by conducting "an accurate and thorough assessment of the potential risks and vulnerabilities to the confidentiality, integrity, and availability of electronic protected health information . . . ," to manage the risk by implementing "security measures sufficient to reduce risk and vulnerabilities to a reasonable and appropriate level," to apply and enforce sanction policies, and to implement regular information system reviews. See, e.g., 45 § CFR 164.308(a)(1)(ii)(A)-(D). The regulations further require continuous risk analyses "as needed" to maintain reasonable and appropriate protection of the electronic protected health information and to update documentation of such security measures as required under Title 45, Part 164, Subpart C, of the federal regulations. The failure to conduct such risk analyses can result in large fines from the U.S. federal government and can expose the entity to cyberattacks and other vulnerabilities.

In addition to health care providers, many other entities have a need for conducting risk analyses and implementing risk management solutions to enable them to reduce the likelihood of a breach (or other threat occurrences). As a non-limiting example, medical device manufactures are required to comply with the Privacy, Breach Notification, and Security Rules found in the Health Insurance Portability and Accountability Act ("HIPAA"). In the mergers and acquisition context, business entities often desire a thorough risk analysis to determine excessive risk posed by cyberattacks before making a large investment and/or following an acquisition. Due to the sensitive nature of information in their possession, accounting firms, law firms, and many other entities also require risk analyses of their cybersecurity measures. It will be appreciated that any number of entities and/or individuals desire risk analyses and risk management to increase cybersecurity protections.

The U.S. Department of Health and Human Services, Office for Civil Rights (the "OCR"), is responsible for issuing periodic guidance on the provisions in HIPAA. On Jul. 14, 2010, the OCR issued a guidance document titled "Guidance on Risk Analysis Requirements under the HIPPA Security Rule," the contents of which are fully incorporated herein by reference. In this guidance, the OCR advised that there are nine different elements of a risk analysis, as required under 45 § CFR 164.308(a)(1)(ii)(A) (mentioned above), some of which include: determining the likelihood of a threat occurrence, determining the potential impact of a threat occurrence, and determining the level of risk "for all threat and vulnerability combinations identified during the risk analysis" (collectively referred to herein as conducting a "risk rating" or a "risk rating analysis").

Accordingly, there is an increasing need, particularly for those that store sensitive information on electronic devices, to understand where cybersecurity exposures are located, to determine which of these exposures face the greatest risk, and to understand where to focus one's cybersecurity resources. Herein, the term "user" describes an individual, entity, or organization that desires to conduct a risk rating analysis of an information system. Herein, the terms "information systems" and "assets" are used interchangeably to describe a user's resources that create, receive, store, and transmit electronic information.

Likewise, in order to conduct a robust and ongoing risk analysis and to comply with applicable standards (e.g. the OCR guidance, as a non-limiting example), there is a significant need for users to determine the likelihood of a threat occurrence to their assets, to determine the potential impact of a threat occurrence, and to determine the level of risk (i.e. conduct a risk rating analysis). However, conventional risk rating analyses, methods, systems, and software applications implementing computer-readable media are very challenging, time consuming, inefficient, subjective, and often not accurate (i.e. error-prone) because a user typically has to analyze millions of different combinations when determining the potential risk for a threat occurrence. For example, when undertaking the conventional risk rating analysis, the typical user will have to analyze all of their assets and media (e.g. laptops and third-party service providers as non-limiting examples), determine all of the potential threat agents (e.g. thieves, malware, and power interruptions, as non-limiting examples), analyze the potential threat actions (e.g. burglary, data loss, and destruction of data, as non-limiting examples), the vulnerabilities (e.g. insecure network configuration and insufficient data backup as non-limiting examples), and finally analyze the implemented security controls (e.g. the recommended controls set forth by the National Institute of Standards and Technology ("NIST"), such as the NIST SP 800-53 titled Security and Privacy Controls for Information Systems and Organization, as a non-limiting example). Since there are millions of combinations to analyze, the conventional risk rating analysis takes a significant amount of time, is inefficient, often subjective with lots of variation between different users, and typically not accurate.

It is known to conduct a risk analysis which groups the attributes or components of assets together if the components face the same threats and vulnerabilities based upon the components, component properties, property values, and security controls of the asset. For example, U.S. Pat. No. 10,496,827 titled "Risk Analysis Method and System," the contents of which are fully incorporated herein by reference, discloses a risk analysis method which creates unique components groups if the components face different security risks. However, there remains a significant need for an improved method of determining the likelihood of a threat occurrence, determining the potential impact of a threat occurrence, and determining the level of risk (i.e. conducting a risk rating analysis).

Accordingly, there is a significant need for a risk rating method and system that more accurately rates risk, saves time and effort, is more efficient and robust, provides an improved risk rating analysis, and better complies with applicable laws, standards, and guidances. Along with other features and advantages outlined herein, the risk rating methods and systems according to multiple embodiments and alternatives meet these and other needs by providing a technical solution to the technical problem posed by conventional risk rating methods and systems. In doing so, the risk rating methods and systems, according to multiple embodiments and alternatives, predict and recommend risk ratings for users which saves time and effort, increases accuracy, and provides faster and more efficient risk ratings.

SUMMARY OF EMBODIMENTS

Based on data elements provided by the user, this disclosure describes implementations of systems, devices, methods, and computer-readable media for predicting and recommending the likelihood of a certain threat occurrence to a user's assets, for predicting the potential impact of the threat occurrence, and for predicting the level of risk posed by the threat occurrence. According to multiple embodiments and alternatives, the data elements (which are provided by the user and inputted to the system) are chosen from the group consisting of the asset importance, the number of sensitive records, the number of users, the component groups, the component properties, the threat source, the threat event, the vulnerability, the security controls, and the control responses. After receiving and saving the user's selection of data elements, the risk rating methods and systems filter the input data elements for selected parameters and remove (or exclude) data that is statistically unlikely. To accomplish this data filtering, the method has defined minimum and maximum ranges for various risk scenarios based on the asset importance and the available security controls. Since each security control has a different impact in controlling the risk rating and some security controls are more powerful than others, the system has defined the effectiveness of the available security controls at a component group level, which further contributes to the defined minimum and maximum ranges. The methods and systems then utilize data mining to review historical data for similar records for the particular threat occurrence, and an artificial intelligence engine to predict and recommend the likelihood, the impact, and the risk rating for the threat occurrence(s). In doing so, the embodiments disclosed herein provide more efficient, robust, accurate, and objective risk ratings.

Herein, the term "user" describes an individual, entity, or organization that desires to conduct a risk rating analysis of an information system. Herein, the terms "information systems" and "assets" are used interchangeably to describe a user's resources that create, receive, store, and transmit electronic information.

Herein, the term "components" represents the constituent parts of a user's assets. The term "components" represents the "who," the "what," and the "where" that comprise an asset. For example, the "who" might include users that view or enter data into an information system and administrators that maintain the system. The "what" might include the software that is utilized, the servers and storage devices that support the software, the workstations that access this software, etc. The "where" might include the location where the servers and storage devices are housed, the location of backup tapes, and so forth.

Herein, "component categories" represent different categories of components to facilitate the selection of different components. In some embodiments, component categories consist of backup, end user devices, infrastructure, management, medical devices, networks, people, and software.

Herein, the term "component properties" represents the various attributes of a component such as physical location, operating system, data type, etc. The term "property value" represents additional attributes for describing a "component property." For example, a component property comprising "data type" might further comprise property values consisting of payment card access, personally identifiable information, personal health care information, internal use only, and others. According to multiple embodiments and alternatives, the risk rating method identifies different component properties for each particular component. In a non-limiting example, servers will have different component properties than applications.

Herein, the term "component group" represents a group of components that face the same cybersecurity risks and vulnerabilities. In some embodiments, a component group may consist of components of the same type that are grouped together for risk management purposes, even though the components might belong to different assets.

Herein, the term "controls" refers to the security controls utilized to mitigate and manage cybersecurity threats posed to a component. As will be appreciated by one of ordinary skill in the art, different security controls are applicable to different components. For illustrative and non-limiting purposes, security controls might include anti-malware software, data backup, encryption of disks (full disk, file based, etc.), operating system patching, surge protectors, and others.

Herein, "risk" refers to the impact to a user's assets considering (a) the probability that a particular threat will exercise (accidentally trigger or intentionally exploit) a particular vulnerability and (b) the resulting impact if this should occur. The risk arising from legal liability or mission loss include: unauthorized disclosure, modification, or destruction of information; unintentional errors and omissions; IT disruptions due to natural or man-made disasters; and failure to exercise due care and diligence in the implementation and operation of a user's assets.

Herein, the "risk likelihood" refers to the probability of an adverse impact to an organization considering the ability of the particular threat to exploit the particular vulnerability given predisposing conditions and other implemented controls for the particular component.

Herein, the "risk impact" refers to the magnitude of harm that can be expected to the confidentiality, integrity, or availability of sensitive information if the particular threat were to explore the particular vulnerability given the predisposing conditions and other implemented controls for the particular component.

Herein, the "risk rating" refers to the risk likelihood multiplied by the risk impact. In some embodiments, the risk likelihood is a number in a range between 1 to 5, where 1 is rare and 5 is almost certain. In some embodiments, the risk impact is a number in a range between 1 to 5, where 1 is insignificant and 5 is severe. Accordingly, in some embodiments the risk rating is a number in a range between 1 to 25.

According to multiple embodiments and alternatives, the risk rating method and system includes a database consisting of a list of component categories, components belonging to each component category, component properties corresponding to each component, and property values corresponding to each component property. In some embodiments, the risk rating method prompts a user to analyze the risk of a particular asset at an granular level by first providing the user the list of component categories. From within each component category, the user selects all of the components that are applicable to the asset at issue and the user's selections are received into the risk rating system. Next, the risk rating method and system provides the user with component properties corresponding to each selected component. The user then selects property values for each selected component, and the selected property values are received into the risk rating system.

The risk rating system and method then suggests component groups to the user based on the user's selections. According to multiple embodiments and alternatives, the user will repeat the selection method for each asset, then the asset's components will be appropriately grouped for risk management purposes. In some embodiments, if a component's property values are identical to those of an existing component group, then the component is placed into the same component group because the components face identical threats and vulnerabilities. If a component's property values are not identical, the component is placed into a different component group because the threats and vulnerabilities are not the same. Accordingly, in some embodiments the risk rating method uses a binary approach to create component groups: either the risks are identical and the matching component is placed into an existing component group, or the risks are different (no matter how small the difference) and a separate component group is created for this new component.

According to multiple embodiments and alternatives, the risk rating system and method provides the user with a list of threat sources, threat events, and vulnerabilities for each component group. The risk rating system and method then provides the user with a list of controls that can be utilized to prevent each listed threat source and threat event from exploiting each potential vulnerability. As a non-limiting example, the system may provide the user with a list of controls for analyzing the threat source of a "system cracker," for the threat event of "theft of sensitive data," for the vulnerability "excessive user permissions," and for the component group of electronic medical records (EMR). The system then prompts the user to select the security controls that are implemented for each component group (e.g. EMR as a non-limiting example), and then the selection of security controls (also referred to herein as the "control responses")

are received into the system. In addition, the system prompts the user to rate the importance of the asset (also referred to herein as the "asset importance"), to determine the number of sensitive records, and to list the number of users. Each of these data elements are then inputted, received, and stored into the system.

All of the users' data elements, from both current and historical risk analyses, are stored in a database referred to herein as the "relational data warehouse." Upon receiving the users' data elements, the system stores the data into the relational data warehouse and the system's Artificial Intelligence Engine (referred to herein as the "AI Engine") provides real-time "inference" (also referred to herein as "predictions") to the user by predicting the risk likelihood, the risk impact, and the risk rating for the particular threat and vulnerability to the applicable component. As discussed in more detail below, in order to train and continually update the AI Engine, the system also requests predictions from the AI Engine via periodic bulk requests. The user has the option to select the system's predicted risk likelihood, predicted risk impact, and predicted risk rating; alternatively, the user can simply use the system's predictions as a guide and manually select the likelihood, the impact, and the risk rating. The system also provides the user with the option to "subscribe" to the risk rating system and method. According to multiple embodiments and alternatives, since the AI Engine runs frequently and is continually receiving new data elements from users, the predicted risk ratings may update over time. Accordingly, the "subscribe" option permits the system to notify the user when a particular risk rating is updated by the system.

According to multiple embodiments and alternatives, the risk rating method and system actively evaluates the data elements entered by users and stores the data. The bulk of the data for each user is captured and filtered using general-purpose programming language, e.g., python in Amazon Web Services® (AWS®) Lambda (as a non-limiting example). In addition to AWS®, many other cloud computing platforms may be utilized as known to those of ordinary skill in the art, such as Google App Engine®, and Apple iCloud®. The filtered data from the user is then stored in a cloud storage database (such as an AWS S3® bucket as a non-limiting example), and this database is referred to herein as the "data lake." The data lake serves as the primary, or master, data source for all data used for continually training the AI Engine and for creating inference. In addition to new data provided by a user which is filtered and stored in the data lake (as discussed in more detail below), the historical data from the relational data warehouse is also extracted and stored in the data lake in order to create inference. According to multiple embodiments and alternatives, an application programming interface (e.g. AWS® Serverless API utilizing AWS® Lambdas and python code, as non-limiting examples) is used to extract relevant fields from the relational data warehouse and store them in a data lake file (e.g. a comma separate value file (CSV), as a non-limiting example) and in a database such as a S3 bucket. This file, which contains the selected attributes, is referred to herein as "intelligent data," and is used for training the AI Engine and generating inference for the user.

The intelligent data is then ingested by the AI Engine in a cloud computing platform, then selected parameters are filtered and used to measure the key attributes which impact the prediction or inference. The selected attributes are stored in the system and are also utilized to evaluate the quality of data across a wide range of algorithms discussed herein. As detailed below, Lambda functions are also utilized to train the AI Engine and to add custom attributes to the existing intelligent data. All of the selected attributes are used to create an AI Engine comprising a prediction model, and this model is periodically trained, tuned, and tested with test data. Furthermore, the parameters impacting the accuracy are modified to attain accurate and consistent predictions to the user. In some embodiments, the model is outputted to an S3 location. According to multiple embodiments and alternatives, the AI Engine is used to evaluate data provided by the user in real-time and when receiving periodic bulk data requests. The AI Engine's inference is generally performed using Lambda functions, a machine learning program (e.g. Amazon Sagemaker® as a non-limiting example), and other application programming interfaces (e.g. restful APIs).

According to multiple embodiments and alternatives, the AI Engine performs several tasks in the risk rating system and method, including data pre-processing, model training, as well as model creation and deployment to provide inference to the user. In some embodiments, the AI Engine is based in Amazon Sagemaker® API, and the AI Engine is utilized to implement a number of steps in the inference model, including: pre-processing the user's data by making the data ready before it is added to the AI Engine's model; training the AI Engine's predictions by utilizing selected attributes in the data lake; tuning hyperparameters within the AI Engine's algorithms to decrease error score and improve accuracy; packaging and deploying the inference to an appropriate end-point (e.g. placing the inference in an S3 bucket (which serves as the repository)) followed by creating an endpoint which can be used for real-time inference with a serverless module; and monitoring and maintaining batch transformation requests for performing bulk inference through the AI Engine. According to multiple embodiments and alternatives, the Sagemaker® is built in a scikit-learn library and used to pre-process the data before the AI Engine is trained and tuned. Next, Robust Standard Scaler, Robust Imputer, and One Hot Encoding techniques are used to convert data into appropriate forms for the AI Engine to appropriately learn. Within the AI Engine, the transformed data is then used to tune XGBoost, which is an open source software library that provides inference by implementing gradient boosted decision trees for a variety of programming languages including Python. According to multiple embodiments and alternatives, the AI Engine utilizes XGBoost for training the inference model and creating a multi-classification model solution to identify the following classes: five classes for risk likelihood, ranging from 1 (lowest likelihood) to 5 (highest likelihood), and five classes for risk impact, ranging from 1 (lowest impact) to 5 (highest impact). In addition, the AI Engine utilizes neural networks which utilize the Amazon Sagemaker® linear learner software and methodology. Linear learner models are supervised learning algorithms used for solving either classification or regression problems. The AI Engine further utilizes Multi-Layer Perceptron (MLP) which is a supervised learning algorithm that learns functions by training on the data lake. According to multiple embodiments and alternatives, by utilizing each of these programs and algorithms, the AI Engine ingests and processes the user's data elements, then provides inference to the user by predicting the risk impact, the risk likelihood, and the risk rating posed by the various threats and vulnerabilities to the user's components.

According to multiple embodiments and alternatives, the risk rating method and system receives a user's data elements (which describe the applicable assets), then the method and system provides the user with recommended risk impacts, risk likelihoods, and risk ratings posed by the various threats and vulnerabilities to the user's component groups. In some embodiments, the methods and systems receive the user's data elements, process the data by ingesting selected parameters and removing statistically unlikely data, review historical data in the data lake for similar records for the particular threat occurrence, and then the AI Engine predicts and recommends the likelihood, the impact, and the risk rating for the threat occurrence(s). In doing so, the risk rating method and system more accurately rates risk, saves time and effort in the risk rating process, increases efficiency, and produces a better risk rating analysis that better complies with applicable laws and standards.

BRIEF DESCRIPTION OF THE FIGURES

The drawings and embodiments described herein are illustrative of multiple alternative structures, aspects, and features of the present embodiments, and they are not to be understood as limiting the scope of present embodiments. It will be further understood that the drawing figures described and provided herein are not to scale, and that the embodiments are not limited to the precise arrangements and instrumentalities shown.

FIGS. 7A-7B show a portion of one user interface display of the risk rating method and system, according to multiple embodiments and alternatives.

MULTIPLE EMBODIMENTS AND ALTERNATIVES

Figure 1:
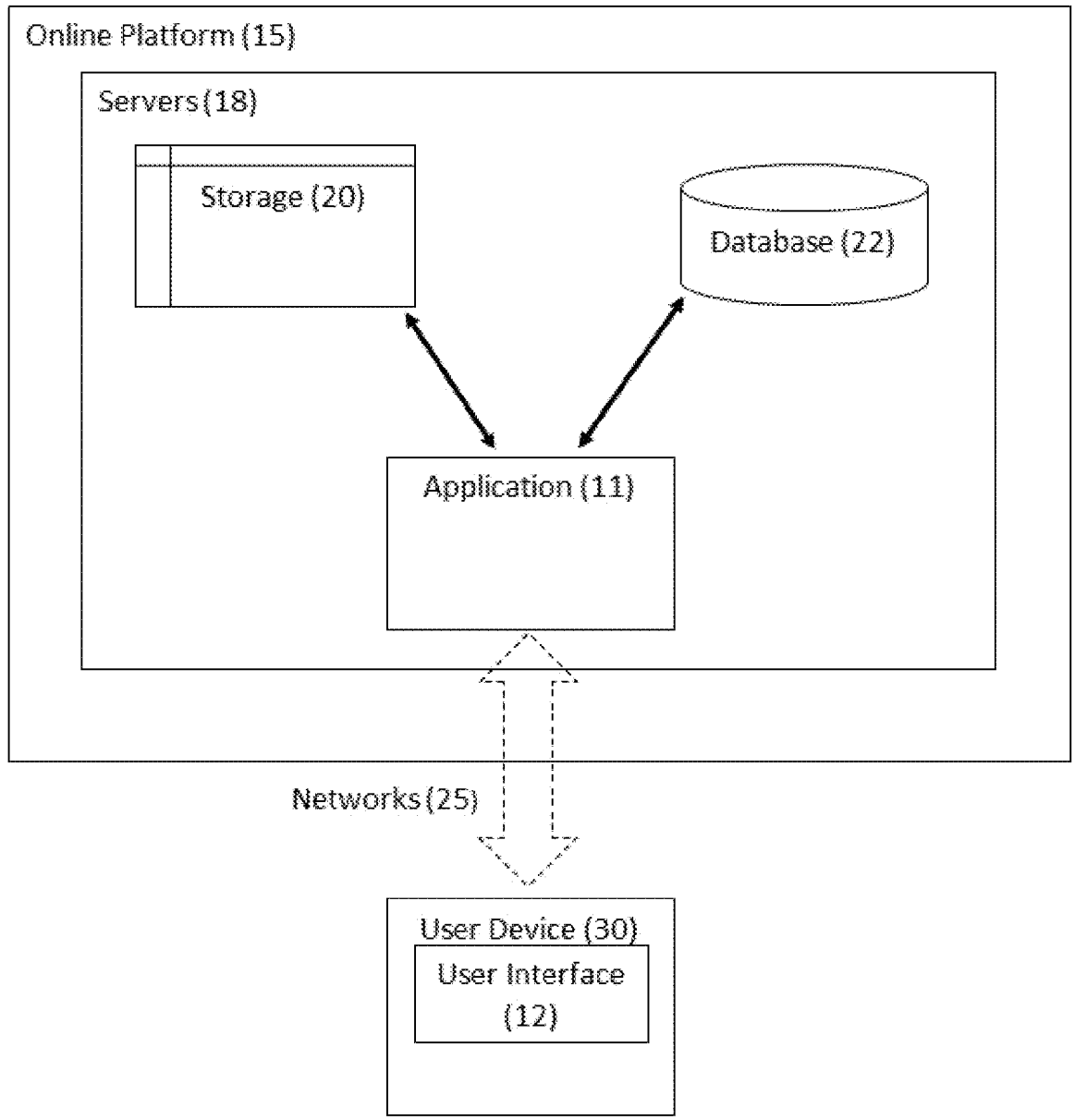
FIG. 1 is a block diagram illustrating a computer architecture to implement the risk rating method and system, according to multiple embodiments and alternatives.

According to multiple embodiments and alternatives, the risk rating method and system 5 is implemented via application 11 of computer architecture 10 (illustrated in FIG. 1). In some embodiments, the application 11 is accessible to a user with an internet connection via an online platform 15. For illustrative (and non-limiting purposes), the online platform 15 is a cloud computing platform such as Amazon Web Services®, Google App Engine®, or Apple iCloud®. In some embodiments, the online platform 15 comprises servers 18, storage 20, database 22 and networks 25. In some embodiments, user interface 12 of user device 30 communicates with application 11 via an internet connection and/or networks 25 as illustrated by the dashed line in FIG. 1. In this manner, the user interface 12 both provides user input to the application 11 and provides the user with output from application 11. One of ordinary skill in the art will appreciate that various kinds of computer architectures may be selected, such as a stand-alone application that can be downloaded to a user's device.

Application 11 implements the risk rating method and system 5 by providing the user (via the user interface 12) with component categories 33, components 35, component properties 40, property values 42, and security controls 48. Next, the user selects the components 35 applicable to the asset being analyzed, and then selects the component's property values 42 and security controls 48. Via the user interface 12, the risk rating method and system 5 then receives the user's selection of components 35, selection of property values 42, and selection of security controls 48, then generates component groups 49, each comprising a set of components that face the same cybersecurity risks and vulnerabilities, thus facilitating an efficient and detailed risk rating analysis.

Figure 2:
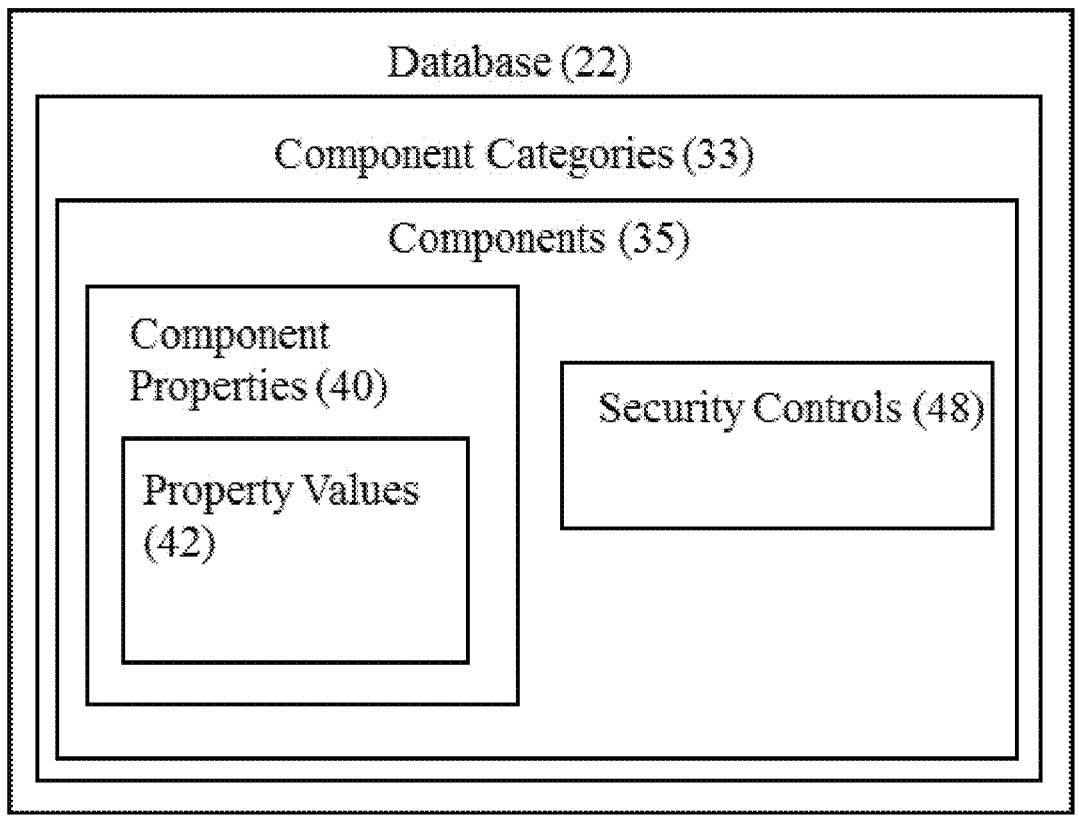
FIG. 2 is a block diagram illustrating a database of the risk rating method and system, according to multiple embodiments and alternatives.
Figure 3:
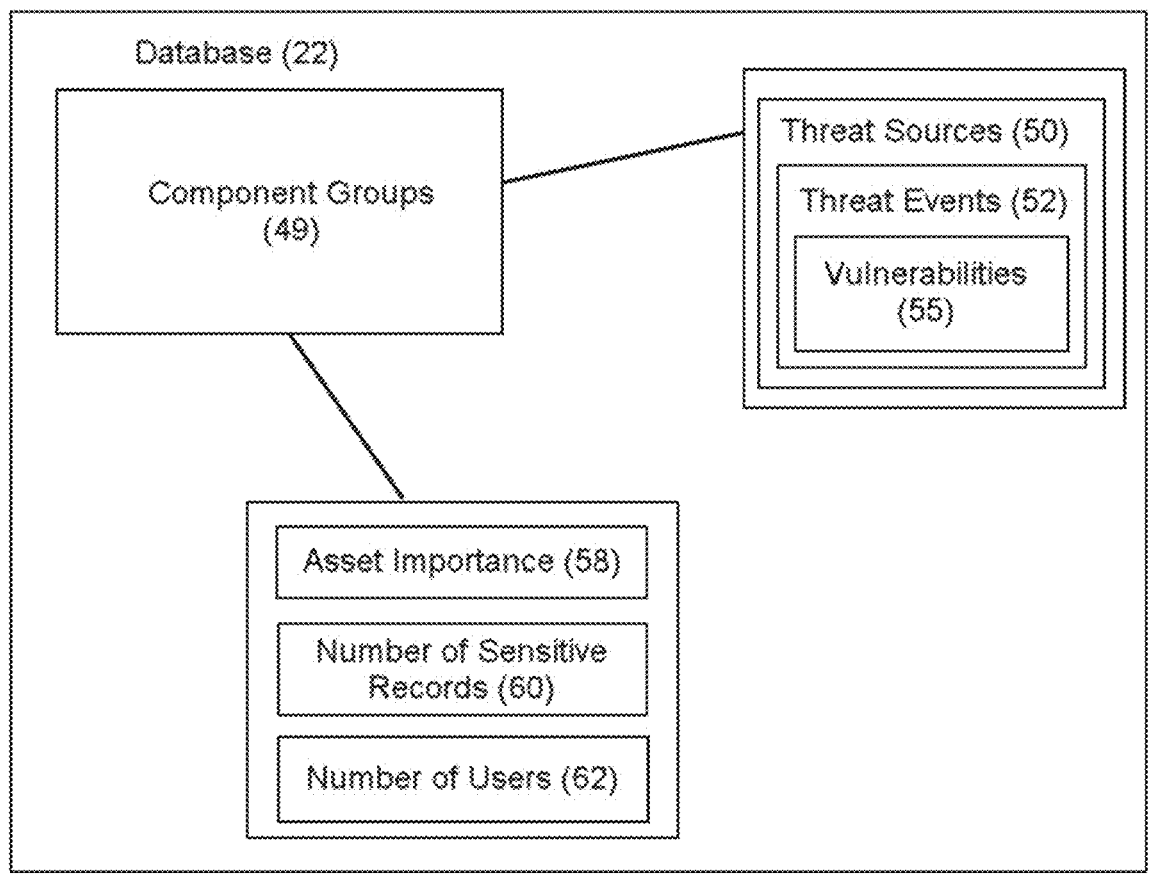
FIG. 3 is a block diagram illustrating a database of the risk rating method and system, according to multiple embodiments and alternatives.

As illustrated in FIG. 2, in some embodiments application 11 includes database 22 comprising component categories 33, components 35 which have been assigned to specific component categories 33, component properties 40 which have been assigned to specific components 35, property values 42 which have been assigned to specific component properties 40, and security controls 48 which have been assigned to specific components 35. Furthermore, as shown in FIG. 3, database 22 further comprises vulnerabilities 55 which have been assigned to threat events 52, threat events 52 which have been assigned to certain threat sources 50, and threat sources 50 which have been assigned to component groups 49. When a user accesses the risk rating method and system 5, the application 11 retrieves the various component categories 33, components 35, security controls 48, component properties 40, and property values 42 from database 22 and provides these attributes to the user. It will be appreciated that the threat sources 50, the threat events 52, and the vulnerabilities 55 provide the user with a number of different risk scenarios applicable to each component group 49.

As will be appreciated by one of ordinary skill in the art, database 22 may be stored in memory 16 of online platform 15 via one or more computer-readable storage media such as an electronic storage medium, a magnetic storage medium, an optical storage medium, a quantum storage medium, a mechanical computer storage medium, and so forth. In addition, memory 16 may provide storage of computer-readable instructions that may describe database 22, application 11, user interface 12, the processes, and other data for implementing the risk analysis method and system 5 as discussed herein. In some embodiments, memory 16 may provide storage of computer-readable instructions or other information in a non-transitory format. When executed by a processor, the computer-readable instructions instruct the processor to perform certain actions. In some embodiments, the memory 16 includes modules that operate to compile source code 17, execute tests, and perform other actions to build the application 11. Memory 16 may also include modules such as user authentication or access control.

To conduct an appropriately detailed risk rating, the risk rating method and system 5 provides the user with a detailed list of attributes that represent risk to an asset. According to multiple embodiments and alternatives, the risk analysis method and system 5 provides this detailed risk analysis by utilizing database 22 that comprises component categories 33, components 35, component properties 40 that have been assigned to particular components 35, property values 42 that have been assigned to particular component properties 40, and security controls 48 applicable to particular components 35 (see FIG. 2). The user then selects the components 35, and sets the property values 42 and security controls 48 applicable to the particular asset being analyzed by the user for cybersecurity threats.

Next, the risk rating method and system 5 creates and suggests component groups 49 to the user which consist of only those components 35 having identical threats and vulnerabilities which are identified by the system 5 when the user selects the components 35, the component properties 40, the property values 42, and the security controls 48 applicable to the particular asset. Once the component groups 49 are created, the method and system 5 prompts the user to rate the asset importance 58, determine the number of sensitive records 60, and determine the number of users 62, for each particular component group 49.

As previously noted and as illustrated in FIG. 3, database 22 further comprises vulnerabilities 55 which have been assigned to threat events 52, threat events 52 which are in turn assigned to certain threat sources 50, and threat sources 50 which are further assigned to component groups 49. Accordingly, the database 22 provides the user with a series of risk scenarios applicable to each component group 49. After the component groups 49 are created, the risk rating method and system 5 provides a series of additional security controls 65 to the user that can be utilized to prevent the various vulnerabilities 55, threat events 52, and threat sources 50 (also referred to herein as "risk scenarios") from exploiting and damaging the particular component group 49 being analyzed. According to multiple embodiments and alternatives, when the security controls 65 are provided to the user, the user may select "Yes," indicating that the user's organization is actively and maintaining and enforcing the control, "In Progress," "No", or "N/A" (collectively referred to herein as control responses 68). In some embodiments, the user's control responses 68 are given different weights. As discussed in more detail below, a "Yes" response is weighted as a "1" in the risk rating method and system 5, while the responses "In Progress," "No," and "N/A" are each given the weight of "0".

Figure 4:
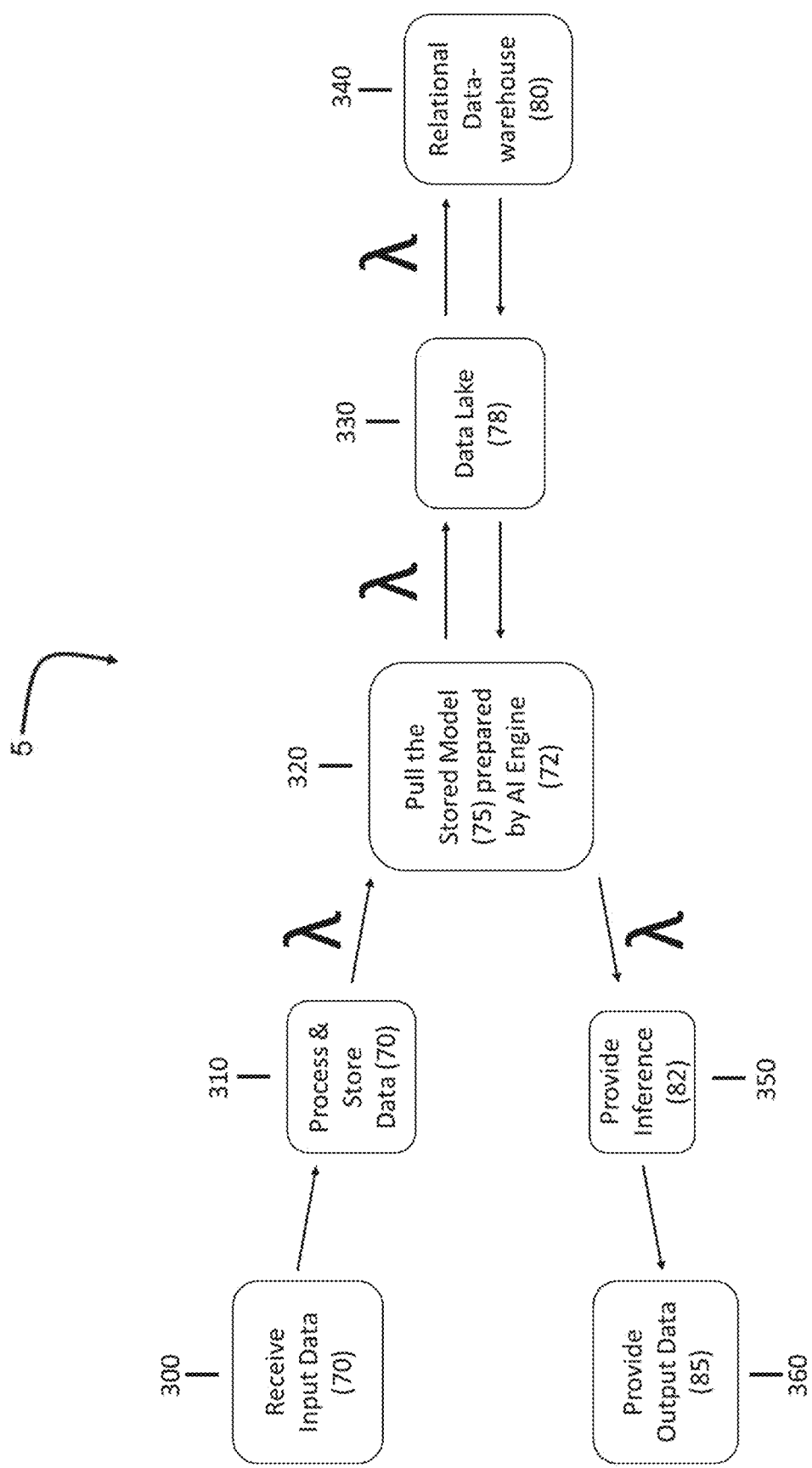
FIG. 4 is a flow chart illustrating the risk rating method and system, according to multiple embodiments and alternatives.

In some embodiments, the data elements 70 are chosen from the group consisting of asset importance 58, the number of sensitive records 60, the number of users 62, the component groups 49, the component properties 40, the threat sources 50, the threat events 52, the vulnerabilities 55, the security controls 65, and the control responses 68. As shown in FIG. 4, after a user is able to access the application 11, the risk rating method and system 5 prompts a user to select the applicable data elements 70 for the asset being analyzed and the selected data is received (300). At step 310, the risk rating method and system 5 processes and then stores selected attributes from the data 70. In some embodiments, the data 70 is processed and certain attributes are selected by utilizing an AWS® Lambda function 88 (in the various figures, a Lambda function 88 is illustrated by the Greek lowercase letter for lambda, "λ"). Next, at step 320, the system 5 pulls the stored model 75 which has been prepared by AI Engine 72. In some embodiments, the system 5 compares the user's input data 70 and pulls similar, historical data from the data lake 78 at step 330. In some embodiments, the historical data is pulled from the data lake 78 by utilizing an AWS® Lambda function 88. As previously noted, the relational data warehouse 80 stores all of the users' data elements including from both current and historical risk analyses. Accordingly, at step 340, the system 5 (by utilizing a Lambda function 88 as a non-limiting example) pulls similar, historical data from the warehouse 80. At step 340, system 5 also stores the user's input data 70 into the warehouse 80.

As shown in FIG. 4, at step 350 the system 5 generates and provides inference 82 by utilizing a Lambda function 88. In some embodiments, the inference 82 comprises a predicted risk impact 102, a predicted risk likelihood 105, and a predicted risk rating 108 for each particular vulnerability 55 to the component group 49 being analyzed. The system then provides the inference 82 to the user by outputting data 85 to the application 11 at step 360.

In some embodiments, the risk impact 102 is on a scale from 1 to 5, where 1 is insignificant and 5 is severe. Table 1 illustrates the risk impact 102 of system 5 which includes suggested rankings on the 1 to 5 scale, as well as suggested descriptions, number of records, productivity lost in terms of time (e.g. days and hours as non-limiting examples), and the financial impact. Table 1 is meant to assist the user in analyzing the risk impact 102 and can be adjusted by the user as needed.

TABLE 1

Risk Impact

| Rank | Description | # of Records | Productivity Lost | Financial Impact |
|---|---|---|---|---|
| 0 | Not applicable threat | 0 | 0 | 0 |
| 1 | Insignificant | 0 | 0 | 0 |
| 2 | Minor | 0 | 2 | $20,000 |
| 3 | Moderate | 499 | 4 | $175,000 |
| 4 | Major | 5,000 | 8 | $2,000,000 |
| 5 | Severe | 50,000 | 24 | $20,000,000 |

According to multiple embodiments and alternatives, the risk likelihood 105 is on a scale from 1 to 5, where 1 represents "rare" and 5 represents "almost certain." In further embodiments, the risk likelihood 105 includes a rating of 0 which represents not applicable. Table 2 illustrates the risk likelihood 105 of system 5 which includes suggested ranks on a 0 to 5 scale, as well as suggested descriptions, percent likelihoods, and examples. Table 2 can be modified by the user as needed.

TABLE 2

Risk Likelihood

| Rank | Description | Percent Likelihood | Example |
|---|---|---|---|
| 0 | Not Applicable | 0% likely in the next 12 months | Will never happen |
| 1 | Rare | 5% likely in the next 12 months | May happen once every 20 years or more |
| 2 | Unlikely | 25% likely in the next 12 months | May happen once every 10 to 19 years |
| 3 | Moderate | 50% likely in the next 12 months | May happen once every 3 to 9 years |
| 4 | Likely | 75% likely in the next 12 months | May happen once every 1 or 2 years |
| 5 | Almost Certain | 100% likely in the next 12 months | May happen at least once a year |

According to multiple embodiments and alternatives, the risk rating 108 is equal to the risk likelihood 105 multiplied by the risk impact 102, and the risk rating 108 is on a scale from 1 to 25. Table 3 illustrates the risk rating 108 of system 5 which includes suggested risk ratings 108 on a scale of 1 to 25, where the risk likelihood 105 is on the x-axis and the risk impact 102 is on the y-axis. Table 3 can be modified by the user as needed.

TABLE 3

Risk Rating

| Impact | | | | | |
|---|---|---|---|---|---|
| Severe (5) | Low | Medium | High | High | Critical |
| Major (4) | Low | Medium | Medium | High | High |
| Moderate (3) | Low | Low | Medium | Medium | High |
| Minor (2) | Low | Low | Low | Medium | Medium |
| Insignificant (1) | Low | Low | Low | Low | Low |
| | Rare (1) | Unlikely (2) | Moderate (3) | Likely (4) | Almost Certain (5) |
| | Likelihood | | | | |

According to multiple embodiments and alternatives, when a user completes a risk rating analysis of a component group 49, the risk rating method and system 5 generates a risk rating report 110. In some embodiments, the risk rating report 110 provides a risk likelihood 105, a risk impact 102, and a risk rating 108 posed by a certain threat event 52 and a vulnerability 55 to a certain component group 49. In further embodiments, the risk rating report 110 describes the controls 65 applicable to the risk scenario being analyzed and the user's control responses 68 which indicate whether or not the controls 65 are in place. If a user receives an inquiry from a governmental or regulatory entity about the required risk rating analysis, the risk rating report 110 can be utilized to show compliance with the applicable laws, regulations, and policies.

Table 4 (below) provides a non-limiting example of a risk rating report 110 generated by system 5. As shown in Table 4, the vulnerability 55 of "endpoint data loss/theft" from the threat event 52 of "malicious user/improper access to, or user or destruction of sensitive data" posed to the component group 49 of "desktop/image viewing workstations" is being analyzed. Based on the controls 65, the user's control responses 68, and the other data elements 70, the system 5 generates and suggests a risk likelihood 105, a risk impact 102, and a risk rating 108. As will be discussed below, these predictions (or inferences 82) can be accepted by the user or modified as desired.

In the non-limiting example shown in Table 4, the component group 49 of "desktop/image viewing workstations" is an important component and results in a higher risk impact 102 rating of "5". In this particular example, the user's control responses 68 indicate that only one applicable control 65 is in place, while the others are "No" or in "Progress." In some embodiments, a "Yes" response is weighted as a "1" in the risk rating method and system 5, while the responses "In Progress," "No," and "N/A" are each given the weight of "0". Accordingly, based on the user's control responses 68, the system 5 generates a higher risk likelihood 105 rating of "4". Since the risk rating 108 is equal to the likelihood 105 multiplied by the impact 102, the risk rating 108 in Table 4 is "20." In some embodiments, the user may input "control notes" about each control 65 and control response 68 that are saved by system 5 and included with the risk rating report 110.

TABLE 4

Risk Rating Report

| Component Group (49) Name | Physical Location | Threat Event (52) | | | |
|---|---|---|---|---|---|
| Desktop/Image Viewing Workstations Asset(s): See ThruMe PACS | Radiology Department | Malicious Use/Improper Access to, or Use or Destruction of Sensitive Data | | | |
| Vulnerability (55) | Risk Likelihood (105) | Risk Impact (102) | Risk Rating (108) | Created Date | Updated Date |
| Endpoint Data Loss/Theft | 4 | 5 | 20 | Oct. 14, 2019 | Mar. 15, 2020 |
| Control (65) | Type | Control Response (68) | Control Notes | | |
| Data Loss Prevention Tools | Global Control | No | The organization screens all outgoing email form PHI and PII. If it finds any, it will automatically stop the email transmission and notify the sender. | | |
| Limited Access to Output Devices (Printers, etc.) | Component Control | In progress | Most printers and copiers located in the administrative areas are only accessible by administrative staff. However, there are no constraints on which administrative staff have access. | | |
| Locked Down External Ports (USB, CD, DVD, Firewall, etc.) | Component Control | No | | | |
| Move Radiology Viewing Desktops to a Locked Room | Component Control | Yes | | | |
| Restrictions on the Use of Internet File Storage | Component Control | No | | | |
| Security/Privacy Awareness and Training | Global Control | No | | | |

Table 5 provides another non-limiting example of a risk rating report 110 generated by system 5. As shown in Table 5 below, the vulnerability 55 of "dormant accounts" from the threat event 52 of "malicious user/improper access to, or user or destruction of sensitive data" posed to the component group 49 of "application/acquired EMR" is being analyzed. Based on the controls 65, the user's control responses 68, and the other data elements 70, the system 5 generates and suggests a risk likelihood 105, a risk impact 102, and a risk rating 108. These predictions (or inferences 82) can be accepted by the user or modified as desired.

In this non-limiting example in Table 5, the component group 49 of "application/acquired EMR" is typically very important for a user's system and receives a higher risk impact 102 rating of "4". In this example, the user's control responses 68 indicate that the majority of the controls 65 are in place to prevent this threat and vulnerability from impacting this particular component group and thus the risk likelihood 105 receives a "4" which is lower than the rating in Table 4. Accordingly, the risk rating 108 in Table 5 is "16" and the user's control notes have been included in this risk rating report 110.

TABLE 5

Risk Rating Report

| Component Group (49) Name | Physical Location | Threat Event (52) | | | |
|---|---|---|---|---|---|
| Application/ Acquired EMR Asset(s): Acquired EMR | | Malicious Use/Improper Access to, or Use or Destruction of Sensitive Data | | | |
| Vulnerability (55) | Likelihood (105) | Impact (102) | Risk Rating (108) | Created Date | Updated Date |
| Dormant Accounts | 4 | 4 | 16 | Oct. 8, 2019 | Oct. 23, 2020 |
| Control (65) | Type | Control Response (68) | Control Notes | | |
| Access Logging | Component Control | Yes | The Cure Team EMR logs all user access. | | |
| Event Correlation | Component Control | Yes | | | |
| Log Aggregation and Analysis | Component Control | Yes | | | |
| Prompt Account Termination | Component Control | Yes | | | |
| Session Auditing | Global Control | No | | | |
| Single Sign-on | Component Control | Yes | | | |
| User Account Management | Component Control | Yes | The organization does not have any Identity Access Management program or any other integration of employee systems with Active Directory accounts. | | |
| User Activity Review | Component Control | Yes | Reviews of EMR activity only occur when a complaint is lodged or a potential incident is reported. | | |

Figure 5:
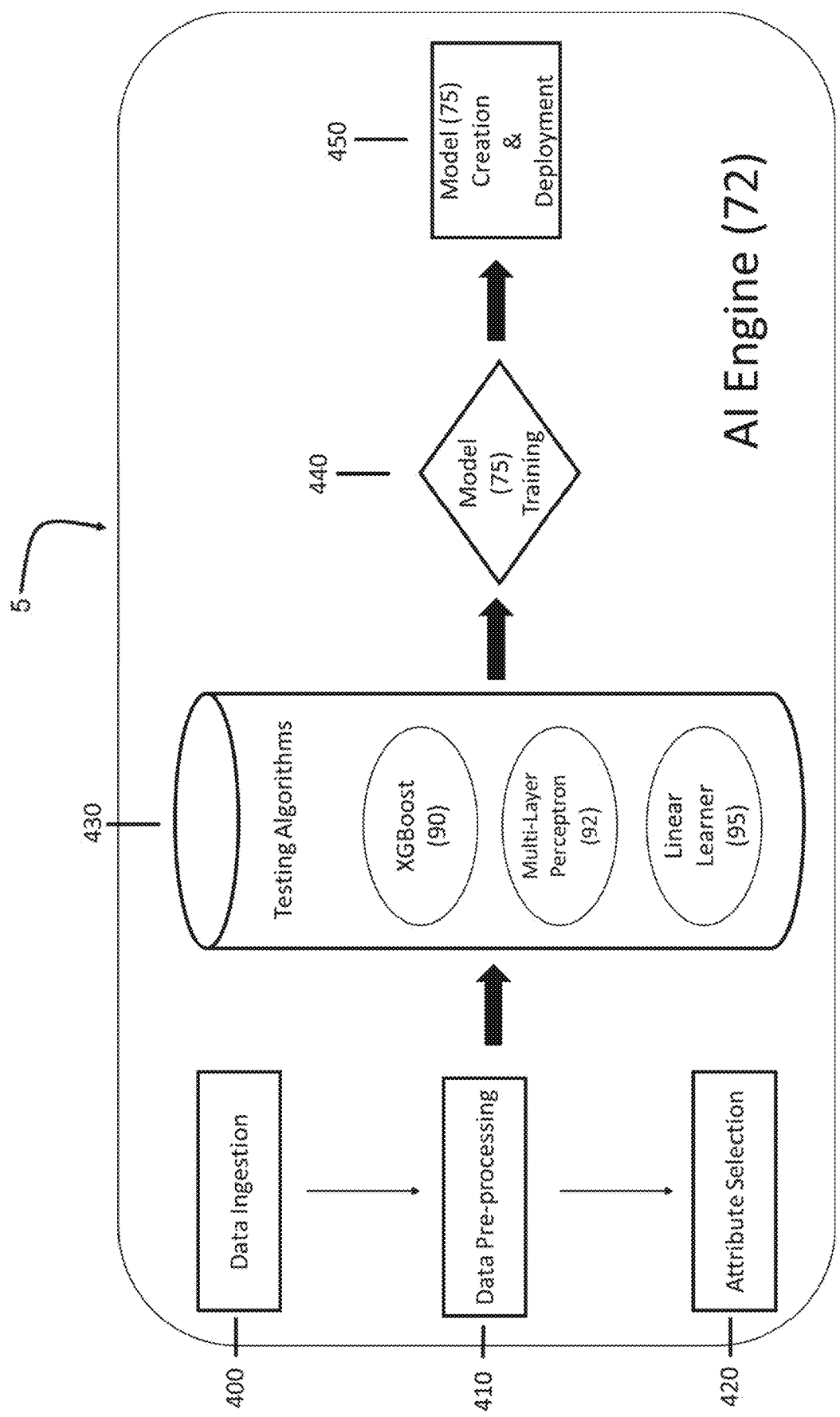
FIG. 5 is a flow chart illustrating the risk rating method and system and an AI Engine, according to multiple embodiments and alternatives.

FIG. 5 illustrates a non-limiting example of an AI Engine 72. In some embodiments, the AI Engine 72 is utilized to create a model 75 which can provide inference 82 to a user based on the user's selected data elements 70 and historical data pulled from the data lake 78 and data warehouse 80. In some embodiments, the AI Engine 72 is based in Amazon Sagemaker® API and a scikit-learn library. As shown in FIG. 5, the AI Engine 72 first ingests data (step 400), conducts data pre-processing at step 410, and selects the applicable attributes at step 420. Next, at step 430, the AI Engine 72 implements and tests a number of algorithms, Lambda functions 88, and other application programming interfaces. At step 430, the AI Engine trains the algorithms by utilizing the selected attributes from step 420 and the AI Engine tunes various hyperparameters to decrease error score and improve accuracy.

In step 430, Robust Standard Scaler, Robust Imputer, and One Hot Encoding techniques (as non-limiting examples) are used to convert data into appropriate forms for the AI Engine 72 to appropriately learn. During step 430, the transformed data is used to tune XGBoost 90, and XGBoost 90 is in turn utilized to train the inference model 75 and create a multi-classification model solution to identify the previously mentioned classes: five classes for risk likelihood 105, ranging from 1 (lowest likelihood) to 5 (highest likelihood), and five classes for risk impact 102, ranging from 1 (lowest impact) to 5 (highest impact). In addition, at step 430, the AI Engine 72 implements the Amazon Sagemaker® linear learner software 95 to solve either classification or regression problems. The AI Engine 72 further utilizes Multi-Layer Perceptron (MLP) 92 which is a supervised learning algorithm that learns function by training on the data lake.

As shown in FIG. 5, the AI Engine 72 next trains the model 75 at step 440. At step 450, the model 75 is created and deployed to the system 5 in order to process a user's data elements 70 and provide inference 82 to the user as discussed herein.

In some embodiments, the risk rating method and system 5 periodically requests inferences 82 from the AI Engine 72 via periodic bulk requests, according to the chart illustrated in FIG. 4. Since the system 5 will continually receive and store new data elements 70 from users, the inferences 82 may update over time. Accordingly, the system 5 continually updates and trains the model 75 by updating the inferences 82 based on the new data elements 70. In some embodiments, the periodic bulk requests (also referred to herein as "batch inference") to the AI Engine 72 occur every fifteen minutes. However, other time periods and requests may be utilized as known to one of ordinary skill in the art.

According to multiple embodiments and alternatives, the batch inference begins by first transforming input data 70 in bulk by using the Amazon Sagemaker® API (e.g. at step 300 in FIG. 4). Next, selected attributes are pushed into S3 buckets in the form of CSV files (e.g. between step 300 and step 310 in FIG. 4) and stored at step 310. In some embodiments, the CSV files are pulled by serverless code running in Python in AWS® Lambda Services (i.e. by utilizing a Lambda function 88). The Lambda function 88 uses boto 3 library to invoke an Amazon Sagemaker® batch transformation API. Next, the Sagemaker® batch transformation API pulls data from the specified S3 bucket, then the model 75 is invoked (e.g. step 320) and provides inference 82 on the data 70 provided in CSV file format (at step 350). The inference 82 is stored in another S3 bucket, which is then pulled and loaded onto the database 22 (e.g. at step 360).

Figure 6:
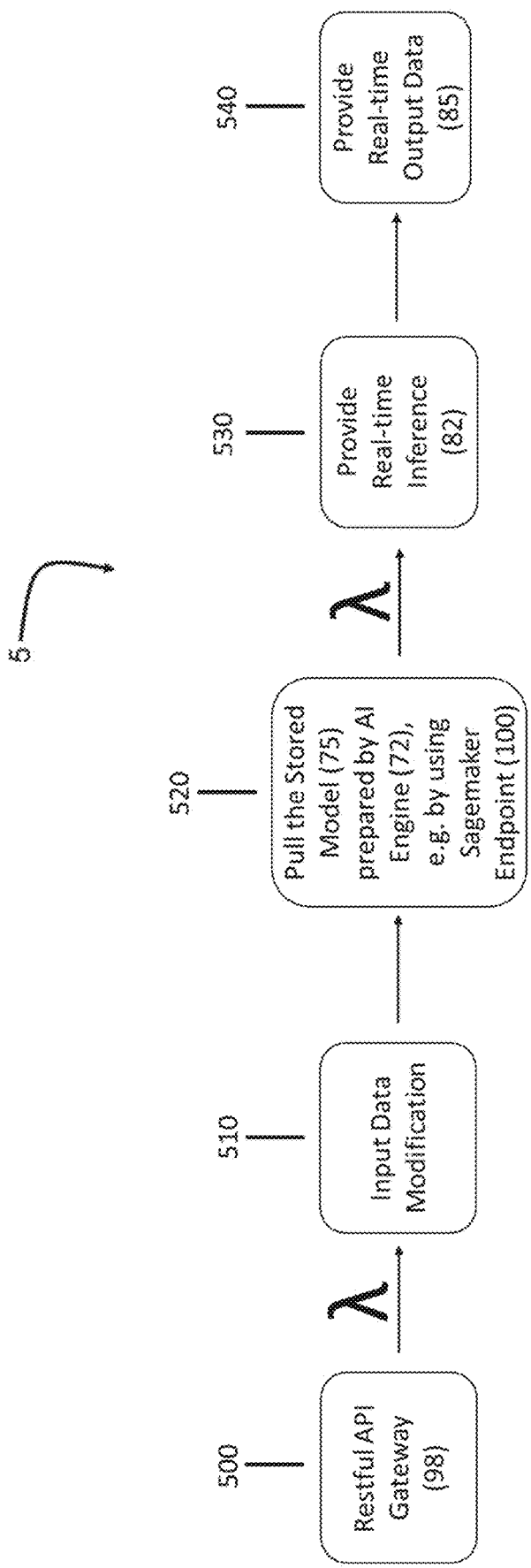
FIG. 6 is a flow chart illustrating the risk rating method and system, according to multiple embodiments and alternatives.

According to multiple embodiments and alternatives, as the user is conducting a risk rating analysis of its assets, the system 5 will provide predicted values for the risk likelihood 105 and risk impact 102 in real-time and in responses to raw data 70 that is provided by the user. As shown in FIG. 6, a Sagemaker® inference pipeline API is used to provide inference 82 from raw data 70 that is provided through Restful API's and S3 buckets. In some embodiments, a restful API gateway 98 sends real-time request(s) at step 500 to modify the input data 70 (at step 510). In some embodiments, a Lambda function 88 performs the data modification at step 510. At step 520, the real-time request is then sent to a Sagemaker® managed endpoint 100 to pull the stored model 75 prepared by the AI Engine 72. Next, a Lambda function 88 is utilized to provide real-time inference 82 on the raw data 70, and the output data 85 is provided to the database 22 and the user at step 540. In some embodiments, the real-time inference 82 illustrated in FIG. 6 is managed through a serverless framework in AWS® Lambda Services wherein python code is used to receive the request, pass the request to a Sagemaker® managed endpoint 100, and retrieve the results.

Figures 7A, 7B:
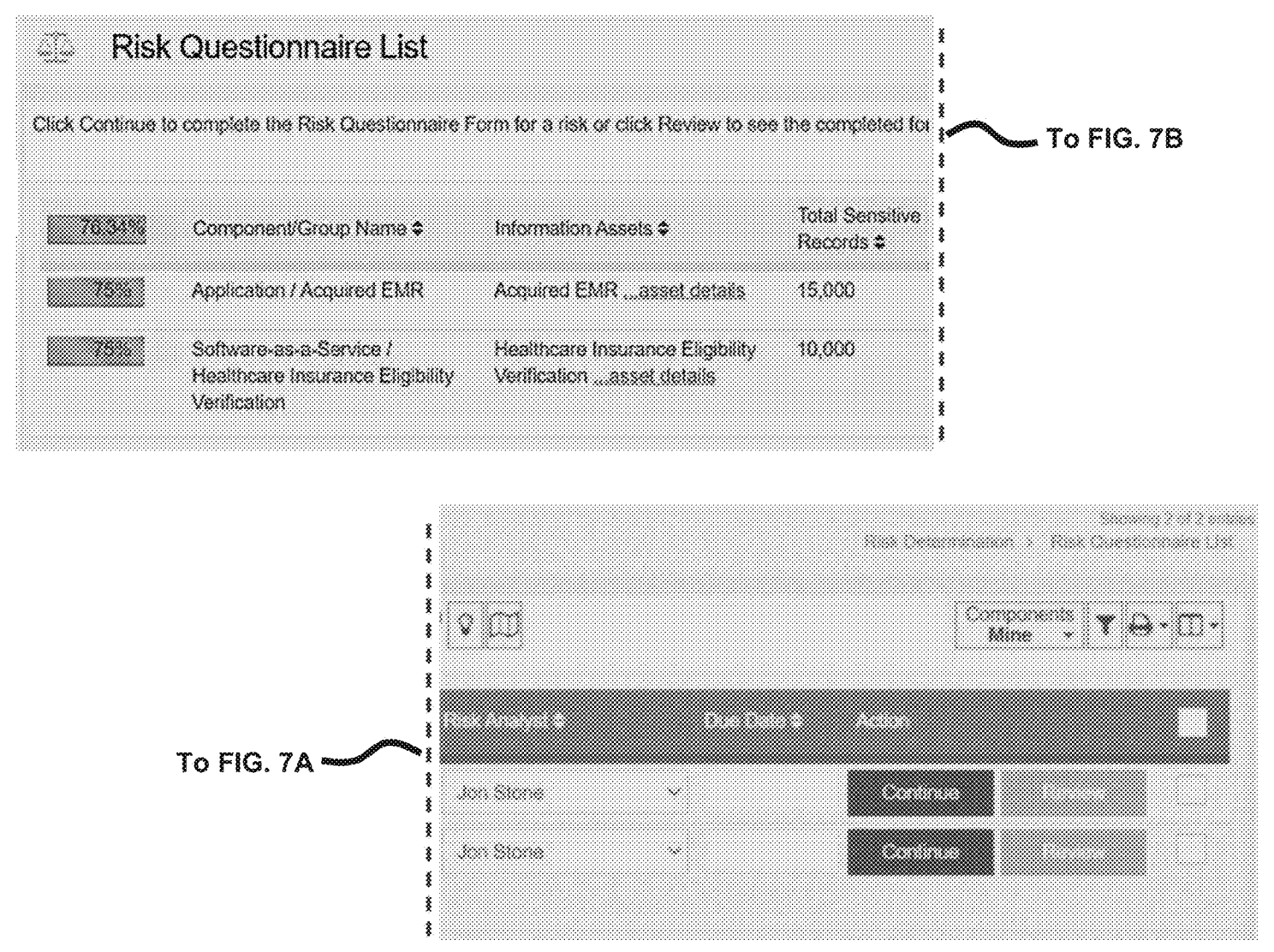
Figure 8:
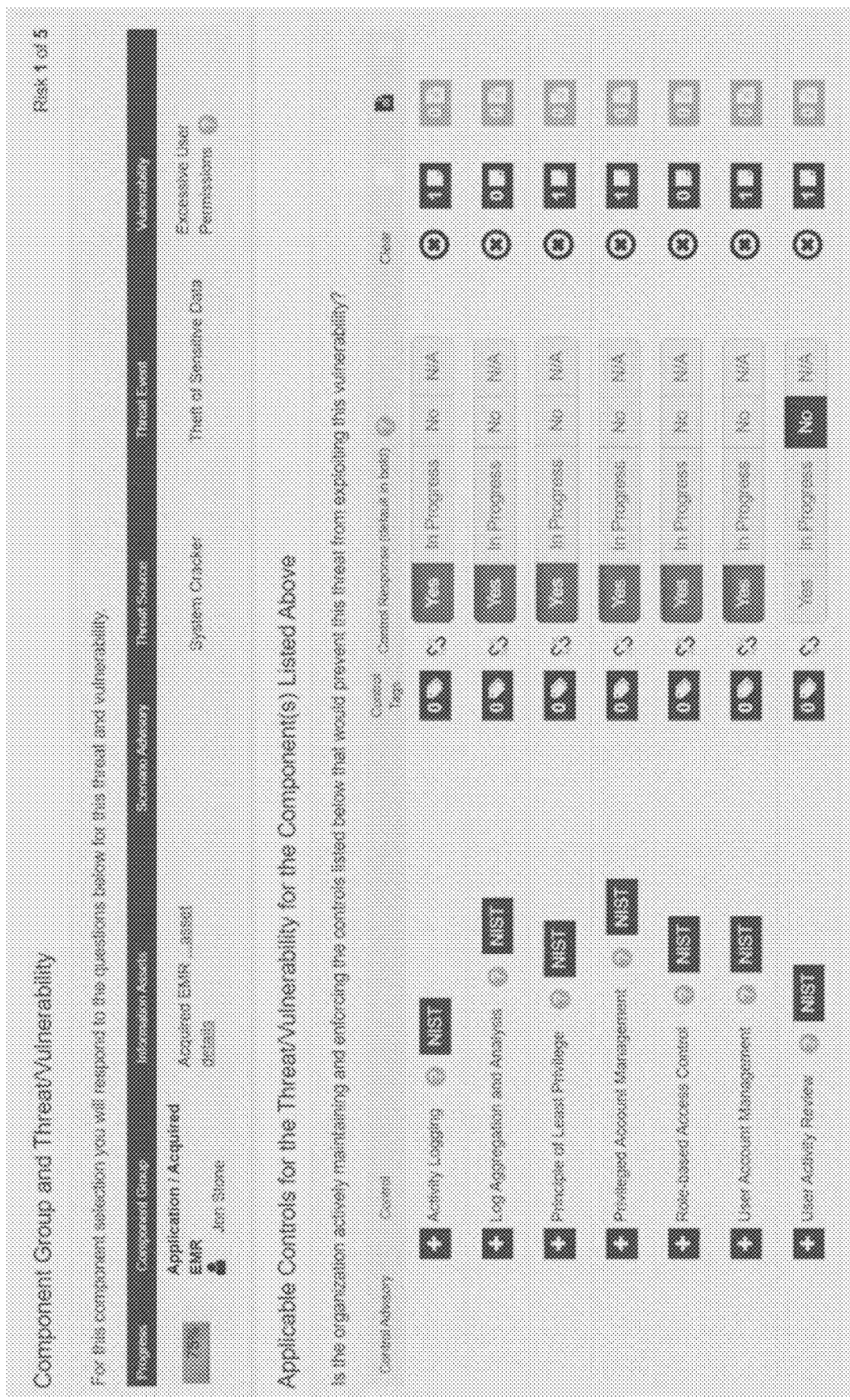
FIG. 8 shows a portion of the user interface display of the risk rating method and system, according to multiple embodiments and alternatives.

According to multiple embodiments and alternatives, the system 5 creates component groups 49 which face the same threats and vulnerabilities. Once the component groups 49 have been created, in some embodiments the application 11 requests that the user complete a risk questionnaire to determine the controls 65 and the control responses 68 for each component group 49. As shown in FIGS. 7A-7B (which comprises two figures but consists of one illustrated user interface), the system 5 has created the component group of "Application/Acquired EMR" and "Software-as-a-Service/Healthcare Insurance Eligibility." If a user selects the virtual "continue" button for "Application/Acquired EMR," as shown in the user interface display in FIG. 7B, the application 11 then provides the user with a series of threat sources 50, threat events 52, and vulnerabilities 55 applicable to each component group 49, as well as security controls 65 that can prevent the threats from exploiting the vulnerabilities. For example, as shown in FIG. 8, the application 11 is analyzing the component group "Application/Acquired EMR," for the threat source "System Cracker," for the threat event "Theft of Sensitive Data," and the vulnerability of "Excessive User Permissions." In FIG. 8, the application 11 then prompts the user to select whether the provided security controls 65 are in place by providing the control responses 68 via the virtual buttons for "Yes," "In Progress," "No," or "N/A."

Figure 9:
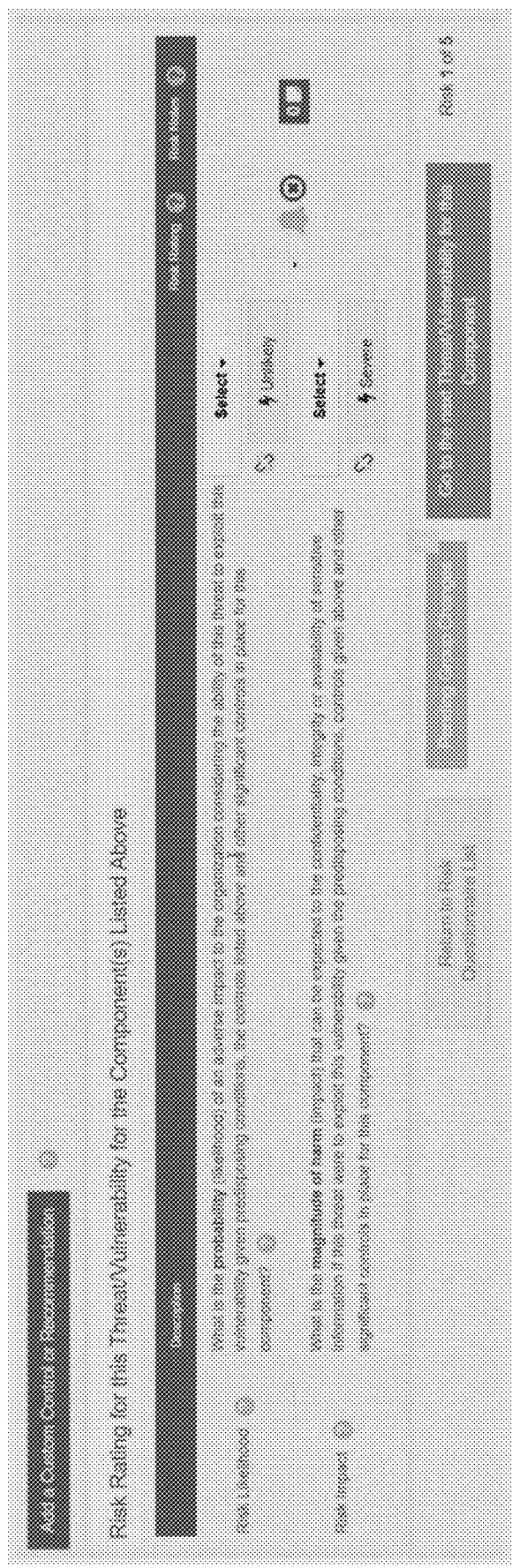
FIG. 9 shows a portion of the user interface display of the risk rating method and system, according to multiple embodiments and alternatives.
Figure 10:
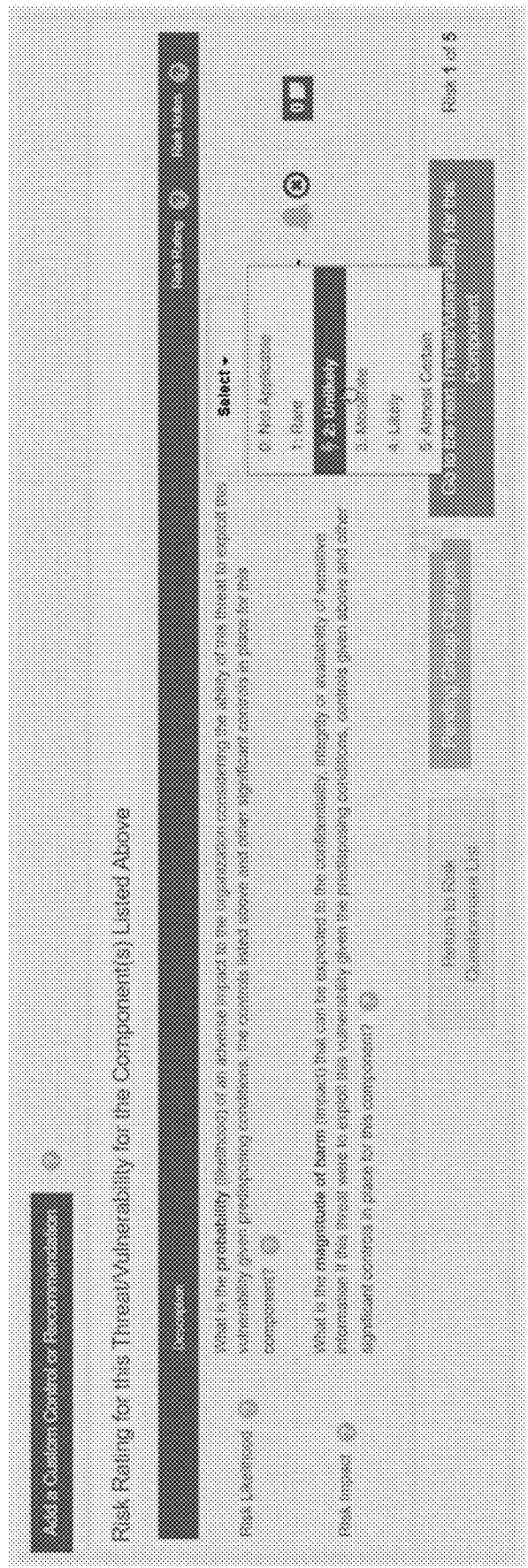
FIG. 10 shows a portion of the user interface display of the risk rating method and system, according to multiple embodiments and alternatives.
Figure 11:
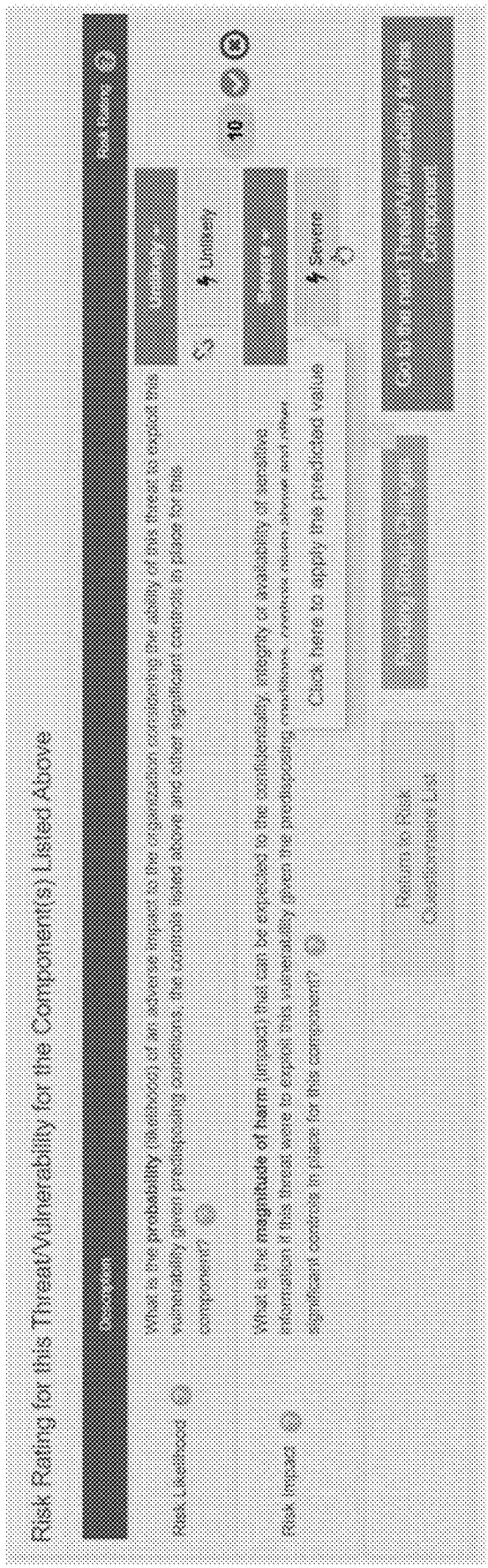
FIG. 11 shows a portion of the user interface display of the risk rating method and system, according to multiple embodiments and alternatives.

According to multiple embodiments and alternatives, once the control responses 68 have been received and processed by the application 11, the system 5 provides a suggested risk likelihood 105 and a suggested risk impact 102 for the particular threat and vulnerability to the particular component (see FIG. 9). If a user selects the drop-down menu by pressing the virtual "Select" button, the user has the option to select the predicted risk likelihood 105 and risk impact 102 (see FIGS. 10-11), or choose other values from the drop-down menu and use the system's predictions as a guide. As shown in FIGS. 9-11, the virtual lightning bolt indicates that the system 5 has suggested a risk likelihood 105 of "2: Unlikely" and a risk impact 102 of "5: Severe" for this particular threat/vulnerability to this component. As shown in FIGS. 10-11, the user has the option to accept the system's predicted risk likelihood 105 and predicted risk impact 102 via the user interface. Once the user has selected the risk likelihood 105 and the risk impact 102, the application 11 provides the user with a risk rating 108. In FIG. 11, the risk rating is 10 (which is equal to 2×5 in this non-limiting example). Once a user has completed the risk rating for the threat/vulnerability, the user can continue with the Risk Questionnaire by selecting the virtual button "Go to the next Threat/Vulnerability for this Component" (see FIG. 11).

Figure 12:
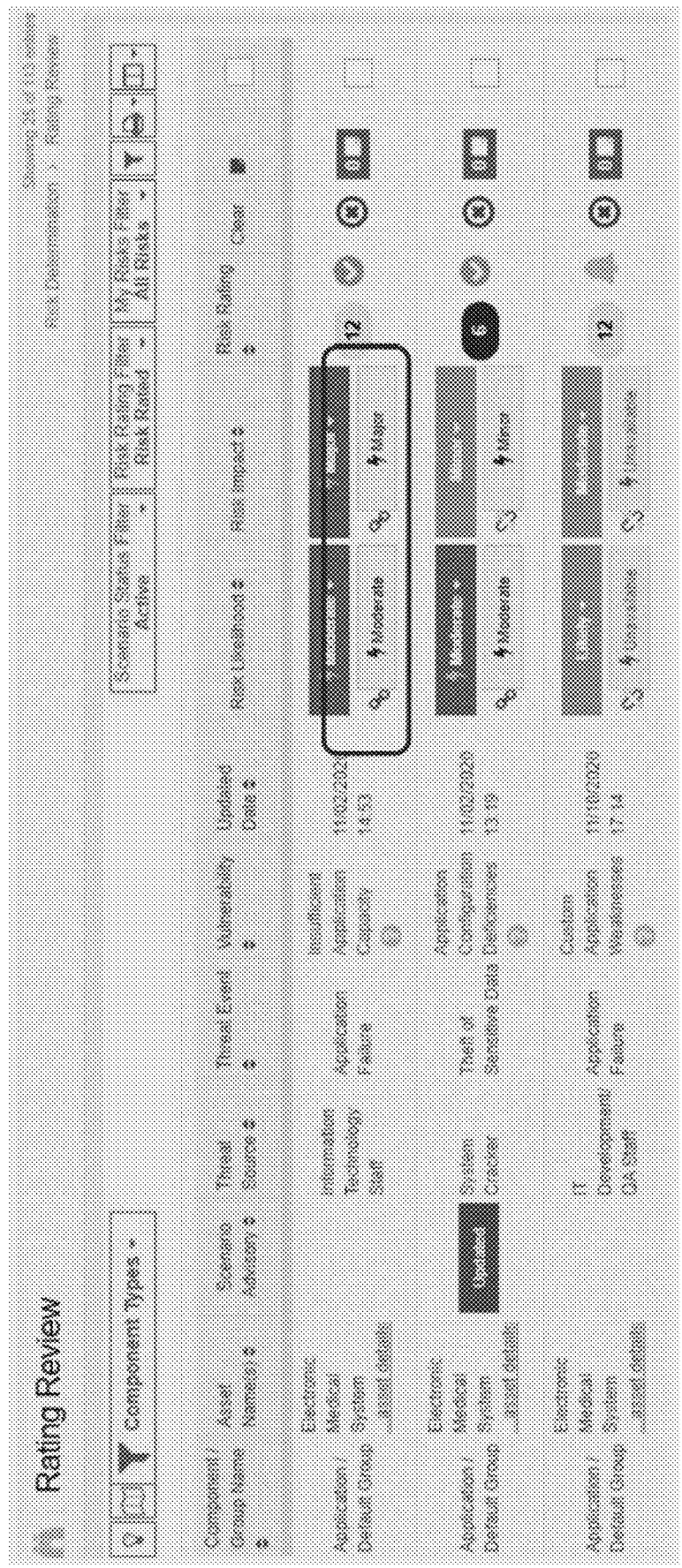
FIG. 12 shows a portion of the user interface display of the risk rating method and system, according to multiple embodiments and alternatives.

In some embodiments, the application 11 allows a user to "subscribe" to changes in the system's inferences 82 for the risk likelihood 105 or the risk impact 102. Since the system 5 is continually receiving new elements 70, the inferences 82 may change over time and a user can automatically incorporate these changes by selecting the virtual "subscribe" button shown in FIGS. 9 and 12 (illustrated by the broken chain links to the left of the risk likelihood 105 and risk impact 102). If a user desires to "subscribe" to these updates, the user can select this virtual button. As shown in FIG. 12, the user interface illustrates that a user has "subscribed" by changing the broken chain links to two connected chain links. For example, in the user interface shown in FIG. 12, the user has selected "subscribe" for the risk likelihood and risk impact for the threat source "Information Technology Staff" as well as the risk likelihood for the threat source "System Cracker."

In some embodiments, the application 11 notifies the user when a new prediction has been generated by the system 5 by displaying a virtual bell (see the bell illustrated to the right of the risk rating of "12" in FIG. 12). Once the user has reviewed the system's new prediction, the application 11 will notify the user. In FIG. 12, the user interface displays a "rating review" by providing the risk likelihood 105, risk impact 102, and risk rating 108 for various threat sources 50, threat events 52, and vulnerabilities 55 to different component groups 49. In FIG. 12, the component group 49 is "Application/Default Group" and the asset name is "Electronic Medical System." The rating review shown in FIG. 12 and provided by application 11, allows the user to monitor the status of its risk rating analysis. As previously noted, the application 11 also generates a risk rating report 110 which can be used to show compliance with the various laws, regulations, and policies that require risk analyses.

All examples provided herein are meant as illustrative of various aspects of multiple embodiments and alternatives of the risk rating method and system. These examples are non-limiting and merely characteristic of multiple alternative embodiments herein.

Example 1—Stored Procedure for Exporting Data for Processing

A source code 17 was developed to build the AI Engine 72 and its model 75 by exporting and processing data 70 from the data lake 78 and relational data warehouse 80. The source code in this example was further utilized to train the model 75 and start the learning process for the AI Engine 72.

In the source code described in this Example 1, the data elements 70 were analyzed, filtered, and then various IDs were assigned including risk scenarios, threats, threat agents, and others. The source code then grouped the various files by assigning control IDs and control names, then the code further processed the data based on the user's control responses 68 as follows:

```
DELIMITER ;;
CREATE PROCEDURE `createRiskDetailsTable`( )
BEGIN
   DECLARE done BOOLEAN DEFAULT FALSE;
   DECLARE done_child_loop BOOLEAN DEFAULT FALSE;
   DECLARE _customer_id INT(11) UNSIGNED DEFAULT NULL;
   DECLARE cur CURSOR FOR SELECT customer_id
                  FROM enabled_locations_tmp
                  GROUP BY customer_id;
   DECLARE CONTINUE HANDLER FOR NOT FOUND SET done := TRUE;
   create or replace temporary table enabled_locations_tmp
   (INDEX cust_loc_index (customer_id, location_id))
   SELECT c.id as customer_id, l.id as location_id, location_name
   FROM clearwater.customers c
        JOIN clearwater.locations l ON (c.id = l.customer_id)
   WHERE l.include_in_normative = '1'
      AND c.company_name NOT LIKE '%Demo%'
      AND c.company_name NOT LIKE '%Test%'
      AND c.company_name NOT LIKE '%Copy%'
      AND c.company_name NOT LIKE '%Clone%'
      AND c.company_name NOT LIKE '%Sandbox%'
      AND c.company_name NOT LIKE '%Training%'
      AND c.company_name NOT LIKE '%Copied%'
      AND l.location_name NOT LIKE '%Demo%'
      AND l.location_name NOT LIKE '%Test%'
      AND l.location_name NOT LIKE '%Copy%'
      AND l.location_name NOT LIKE '%Clone%'
      AND l.location_name NOT LIKE '%Sandbox%'
      AND l.location_name NOT LIKE '%Training%'
      AND l.location_name NOT LIKE '%Copied%'
      AND (c.payment_status IS NULL OR c.payment_status = 'Active')
      AND l.`status` = 'enabled';
   OPEN cur;
   TRUNCATE customer_risk_ratings_tmp;
   tableLoop: LOOP
      FETCH cur INTO _customer_id;
      IF done THEN
         LEAVE tableLoop;
      END IF;
      SET @custId = _customer_id;
      INSERT INTO customer_risk_ratings_tmp
      SELECT @custId as customer_id,
            um.*,
            cgrs.id as component_group_risk_scenario_id,
            `al`.`risk_scenario_id`,
            `al`.`risk_scenario_control_id`,
            `al`.`algorithm_id`,
            `al`.`threat_id`,
            `al`.`threat_action_id`,
            `al`.`threat_agent_id`,
            `al`.`threat_agent_type_id`,
            `al`.`vulnerability_id`,
            GROUP_CONCAT(`al`.`control_id` ORDER BY `al`.`control` ASC) control_ids,
```

```
            GROUP_CONCAT(`al`.`control` ORDER BY `al`.`control` ASC) control_names,
            `al`.`media`,
            `al`.`threat_agent`,
            `al`.`threat_action`,
            `al`.`threat_agent_type`,
            `al`.`vulnerability`,
            GROUP_CONCAT(`cro`.`id` ORDER BY `al`.`control` ASC)
`control_response_ids`,
            GROUP_CONCAT(`cro`.`code` ORDER BY `al`.`control` ASC)
`control_responses`,
            `rr`.risk_likelihood risk_likelihood_id,
            `rr`.risk_impact risk_impact_id,
            `rr`.risk_rating,
            ri.name `risk_impact`,
            rl.name `risk_likelihood`,
            MAX(IF(cro.code = 'yes', COALESCE(rsc.impact_weight, 0), 0))
max_impact_weight,
            MAX(IF(cro.code = 'yes', COALESCE(rsc.likelihood_weight, 0), 0))
max_likelihood_weight
     FROM (
            SELECT DISTINCT
                `a`.`location_id` AS `location_id`,
                CONVERT(BINARY CONVERT(`l`.`location_name` USING latin1) USING
utf8mb4) AS `location`,
                `m`.`id` AS `media_id`,
                `m`.`name` AS `media_name`,
                BINARY CONVERT(`um`.`label` USING utf8mb4) AS `label`,
                BINARY CONVERT(CONCAT(`m`.`name`, '/', if(`um`.`label` IS NOT
NULL,`um`.`label`,'No Label')) USING utf8mb4) AS `media_label`,
                `am`.`unique_media_id` AS `unique_media_id`,
                cpc.value as importance,
                cpc.id as importance_id,
                BINARY CONVERT(FIRST_VALUE(rto.name) OVER (PARTITION BY
am.unique_media_id ORDER BY rto.rank ASC) USING utf8mb4) AS rto,
                BINARY CONVERT(FIRST_VALUE(rpo.name) OVER (PARTITION BY
am.unique_media_id ORDER BY rpo.rank ASC) USING utf8mb4) AS rpo,
                SUM(`a`.number_of_users) number_of_users,
                SUM(`a`.`stored_records`) AS `stored_records`,
                GROUP_CONCAT(`a`.`id` ORDER BY `a`.`name` ASC) asset_ids,
                CONVERT(BINARY CONVERT(GROUP_CONCAT(`a`.`name` ORDER BY
`a`.`name` ASC) USING latin1) USING utf8mb4) asset_names,
                `um`.`status` AS `status`,
                `um`.`user_id` AS `user_id`,
                'assets' AS `type`
            from `unique_media` `um`
                join `assets_media` `am` on(`am`.`unique_media_id` = `um`.`id` and
`um`.`location_id` = `am`.`location_id`)
                join `media` `m` on(`m`.`id` = `um`.`media_id`)
                join `assets` `a` on(`a`.`id` = `am`.`asset_id`
                and `um`.`location_id` =
`a`.`location_id`)
                left join `component_group_property_choices` `cgpc` on (
                    um.location_id = `cgpc`.`location_id` and `cgpc`.`unique_media_id` =
`um`.`id`)
                join `component_properties` `cp` on (`cgpc`.`component_property_id` =
`cp`.`id` and `cp`.`name` = 'importance')
                join `component_property_choices` `cpc` on (`cp`.`id` =
`cpc`.`component_property_id` and `cpc`.`id` = `cgpc`.`choice_id` AND cpc.value <>
'Undecided')
                join `enabled_locations_tmp` `l` on(`l`.`location_id` =
`um`.`location_id`)
                LEFT JOIN `system_options` `rto` ON `a`.`rto_id` = `rto`.`id`
                LEFT JOIN `system_options` `rpo` ON `a`.`rpo_id` = `rpo`.`id`
            where `um`.`deleted` in (-2,-1,0)
              and `am`.deleted in (-2,-1,0)
              and `a`.`deleted` in (-2,-1,0)
              and `a`.`status` in ('enabled')
              AND `um`.`status` IN ('enabled')
              and (`l`.`customer_id` = @custId)
            group by `a`.`location_id`,`m`.`id`,`am`.`unique_media_id`
            UNION ALL
            select distinct `pl`.`location_id` AS `location_id`,
                CONVERT(BINARY CONVERT(`l`.`location_name` USING latin1)
USING utf8mb4) AS `location`,
                `m`.`id` AS `media_id`,
                `m`.`name` AS `media_name`,
                BINARY CONVERT(`um`.`label` USING latin1) AS `label`,
                BINARY CONVERT(CONCAT(`m`.`name`,'/', if(`um`.`label` IS NOT
```

```
                NULL,`um`.`label`,'No Label')) USING utf8mb4) AS `media_label`,
                        `plg`.`unique_media_id` AS `unique_media_id`,
                        cpc.value AS `importance`,
                        cp.id as importance_id,
                        NULL AS `rto`,
                        NULL AS `rpo`,
                        NULL AS `number_of_users`,
                        NULL AS `stored_records`,
                        GROUP_CONCAT(`pl`.`id` ORDER BY `pl`.`name` ASC) asset_ids,
                        CONVERT(BINARY CONVERT(GROUP_CONCAT(`pl`.`name`
ORDER BY `pl`.`name` ASC) USING latin1) USING utf8mb4) asset_names,
                        `um`.`status` AS `status`,
                        `um`.`user_id` AS user_id`,
                        `physical_locations` AS `type`
                from `unique_media` `um`
                        join `physical_location_groups` `plg` on(`plg`.`unique_media_
                        id` = `um`.`id`
and `plg`.`location_id` = `um`.`location_id` and `plg`.`deleted` in (-2,-1,0))
                        join `media` `m` on(`m`.`id` = `um`.`media_id`)
                        join `physical_locations` `pl` on(`pl`.`id` = `plg`.`physical_location_id`)
                        join `enabled_locations_tmp` `l` on(`l`.`location_id` = `um`.`location_id`)
                        join `component_properties` `cp` on (`cp`.`name` = `importance`)
                        join `component_property_choices` `cpc` on (`cp`.`id` =
`cpc`.`component_property_id` and cpc.value = 'Important')
                        where `um`.`deleted` in (-2,-1,0)
                        and `plg`.`deleted` in (-2,-1,0)
                        and `pl`.`deleted` in (-2,-1,0)
                        AND `um`.`status` IN (`enabled`)
                        and (`l`.`customer_id` = @custId)
                        group by `pl`.`location_id`, `m`.`id`, `plg`.`unique_media_id`
                ) um
                        JOIN algorithms_vu al ON (al.media_id = um.media_id AND al. status = 'enabled')
                        JOIN risk_scenarios rs ON (rs.id = al.risk_scenario_id)
                        JOIN risk_scenario_controls rsc on al.risk_scenario_control_id = rsc.id
                        JOIN component_group_risk_scenarios cgrs ON (cgrs.component_group_id =
um.unique_media_id AND cgrs.risk_scenario_id = al.risk_scenario_id AND cgrs.location_id
= um.location_id AND cgrs.deleted IN (-2,-1,0))
                        JOIN component_group_controls cgc ON (cgc.component_group_id =
um.unique_media_id AND cgc.control_id = al.control_id AND cgc.location_id =
um.location_id AND cgc.deleted IN (-2,-1,0))
                        JOIN controls c ON (cgc.control_id = c.id)
                        JOIN global_media_answers gma ON (gma.component_group_control_id = cgc.id
AND gma.deleted IN (-2,-1,0))
                        JOIN risk_ratings rr ON (rr.component_group_risk_scenario_id = cgrs.id AND
rr.deleted IN (-2,-1,0) AND rr.risk_rating > 0)
                        JOIN system_options cro ON (cro.id = gma.answer_id)
                        JOIN risk_impacts ri ON (rr.risk_impact = ri.id AND ri.name <> 'not_applicable')
                        JOIN risk_likelihoods rl ON (rr.risk_likelihood = rl.id AND rl.name <>
'not_applicable')
                        LEFT JOIN system_options rso ON (al.update_status_id = rso.id)
                        LEFT JOIN system_options cso ON (c.control_status_id = cso.id)
                        LEFT JOIN risk_scenario_likelihood_ranges rslr ON (rslr.risk_scenario_id = rs.id)
                WHERE (al.update_status_id IS NULL OR al.advisory_status IS NULL OR
al.advisory_status NOT IN ('Pending Sunset', 'Sunset'))
                        AND (c.control_status_id IS NULL OR cso.code NOT IN ('pending_sunset', 'sunset'))
                        AND cgrs.controls_status = 'completed'
                        AND (rslr.id IS NULL OR (rl.rank BETWEEN rslr.min likelihood AND
rslr.max_likelihood))
                        AND (rs.availability = 0 OR (rs.availability = 1 AND ri.rank BETWEEN
um.importance_id-1 AND um.importance_id+1))
                GROUP BY cgrs.id;
        END LOOP tableLoop;
END ;;
DELIMITER ;
```

In this example, the source code implements data quality controls by ensuring the risk likelihood 105 and risk impact 102 ratings provided by the user are within statistically acceptable ranges. For example, if the risk likelihood 105 data falls outside of the defined range, the source code excludes the data from the model 75 by implementing the following code (mentioned above): "AND (rslr.id IS NULL OR (rl.rank BETWEEN rslr.min_likelihood AND rslr.max_likelihood))." In this example, each risk scenario is manually given defined minimum and maximum scores, as shown in Table 6 below. If, for example, a user's data is given a risk scenario ID of 612, but the user's selected risk likelihood 105 is "4" which is outside the manually defined range, the source code will exclude this data from the model 75 because it is outside of the acceptable range.

TABLE 6

Risk Scenario Likelihood Ranges for Data Filtering

| ID | Risk Scenario ID | Min Likelihood | Max Likelihood |
|---|---|---|---|
| 1 | 612 | 1 | 3 |
| 2 | 618 | 1 | 3 |
| 3 | 622 | 1 | 5 |
| 4 | 625 | 1 | 3 |
| 5 | 633 | 2 | 3 |
| 6 | 636 | 1 | 3 |
| 7 | 640 | 1 | 5 |
| 8 | 646 | 1 | 5 |
| 9 | 650 | 2 | 4 |
| 10 | 655 | 1 | 2 |
| 11 | 659 | 2 | 4 |
| 12 | 662 | 1 | 3 |
| 13 | 666 | 1 | 3 |
| 14 | 672 | 1 | 3 |
| 15 | 676 | 1 | 2 |
| 16 | 688 | 1 | 4 |
| 17 | 697 | 1 | 3 |
| 18 | 698 | 1 | 2 |
| 19 | 700 | 2 | 4 |
| 20 | 863 | 1 | 3 |
| 21 | 743 | 2 | 5 |
| 22 | 744 | 1 | 2 |
| 23 | 745 | 2 | 4 |
| 24 | 746 | 1 | 5 |

Similarly, this source code verified that the user's asset importance 58 correlates with the user's risk impact 102 rating, by implementing the following code (mentioned above): "AND (rs.availability=0 OR (rs.availability=1 AND ri.rank BETWEEN um.importance_id-1 AND um.importance_id+1))." If, for example, the code recognized that the asset is very important to the organization (such as EMR), but the user has selected a risk impact of "1", then the code in this example excluded this data as being statistically irrelevant. This code implemented this data filtering by assigning group IDs, group codes, option IDs, and option ranks, to the risk impact 102 ratings, as shown in Table 7. If the user's risk impact 102 rating fell outside of these manually defined ranges, the source code in this example excluded this data from the AI Engine 72 as being statistically unlikely.

TABLE 7

Risk Likelihood and Impact Option Values

| Group ID | Group Code | Option ID | Option Code | Option Rank |
|---|---|---|---|---|
| 15 | Risk likelihood choices | 87 | Not application | 0 |
| 15 | Risk likelihood choices | 88 | Rare | 1 |
| 15 | Risk likelihood choices | 89 | Unlikely | 2 |
| 15 | Risk likelihood choices | 90 | Moderate | 3 |
| 15 | Risk likelihood choices | 91 | Likely | 4 |
| 15 | Risk likelihood choices | 92 | Almost certain | 5 |
| 16 | Risk impact choices | 91 | Not applicable threat | 0 |
| 16 | Risk impact choices | 95 | Insignificant | 1 |
| 16 | Risk impact choices | 96 | Minor | 2 |
| 16 | Risk impact choices | 97 | Moderate | 3 |
| 16 | Risk impact choices | 98 | Major | 4 |
| 16 | Risk impact choices | 99 | Severe | 5 |
| 24 | Asset importance options | 145 | Not important | 1 |
| 24 | Asset importance options | 147 | Somewhat important | 2 |
| 24 | Asset importance options | 148 | Important | 3 |
| 24 | Asset importance options | 149 | Very important | 4 |
| 24 | Asset importance options | 150 | Critically important | 5 |

Example 2—AWS® Lambda Script for Data Translation and Merging of Exported Data

Before the learning stage described above in Example 1, an AWS® Lambda Script was developed to prepare data 70, provided by the user, for processing by the AI Engine 72. For example, this lambda script was implemented between steps 310 and 320 in FIG. 4. Furthermore, this script was responsible for messaging and formatting received data to ensure it was properly received by the AI Engine 72.

In this example, the user's data 70 was separated into two columns consisting of risk impact 102 and risk likelihood 108. To process the risk likelihood 108 data, this script focused on whether the security controls 65 were in place and assigned different control IDs (and created columns for the AI Engine 72). If a control 65 was in place (as shown by the control responses 68), the script provided a weighted value of "1". However, if a control 65 was not in place, in progress, or not available, the script provided a weighted value of "0." Accordingly, only implemented controls 65 were given any weight in this script. Once this data was processed, the AI Engine 72 analyzed whether the individual controls 65 were in place, determined the risk likelihood 108, then analyzed similar control responses from the data lake 78 for this particular risk scenario to generate inference 82.

However, to process the risk impact 102, the user's control responses 68 were not processed. Rather, this script focused on the asset importance 58 when conducting data processing on the user's risk impact 102 ratings.

The script in this Example 2 comprised:

```
import boto3
import awswrangler as wr
import pandas as pd
import datetime
from boto3.s3.transfer import TransferConfig
config=TransferConfig(max_concurrency=2)
def split_controls(df_controls, df_response_ids, weights):
    #list of active control ids
    control_ids=
```

[26,27,28,29,32,33,34,36,37,38,39,40,41,42,43,44,45,46, 47,48,49,50,51,52,53,56,57,58,60,61, 62,64,65,66,67,68,69, 70,71,72,73,74,75,76,77,78,79,80,81,83,84,85,86,87,88,89, 90,91,92,94, 95,96,97,98,99,100,101,102,103,105,106,107, 108,109,110,111,112,113,114,115,116,117,118, 119,120, 121,122,124,125,126,127,128, 132, 133, 135,136, 137,138, 139,140, 141, 154, 155, 156, 157,158,159,160,161,162,163, 164,165,166,167,168,169,170,171, 172, 173, 174, 175, 176, 177, 178, 179,180,181,182,183,184,185,186,187,188,189, 190,191,192,193,194,195,196,197,198,199,20 0,202,203, 204,205,206,207,208,209,210,211,212,213,214,215,216, 217,224,229,243,239,244, 249,254,259]

```
#map control responses to weight
imp_map = {83: 0, 82: 0, 81: 0, 80: 1} #80 is yes =1 in progress, no, N/A = 0
maxlen = len(control_ids) # find max length in 'control_ids' column, this number of columns is added
cols = ["control_"+str(x) for x in range(maxlen)] # create new column names
    c_rows = [ ]
    for index, value in df_controls.items( ):
        c_ids = value.split(",")
        cr_ids = list(map(int, df_response_ids[index].split(",")))
        cr_weights = list(map(int, weights[index].split(",")))
        row_vals = [ ]
        for c_id in control_ids:
            val = 0
            for i, e in enumerate(c_ids):
                if int(e) == int(c_id):
                    val = imp_map[cr_ids[i]] * cr_weights[i]
            row_vals.append(val)
        c_rows.append(row_vals)
    df_cr = pd.DataFrame(data=c_rows, columns=cols)
    return df_cr
def lambda_handler(event, context):
    config = TransferConfig(max_concurrency=2)
    s3 = boto3.resource('s3')
    suffix = datetime.datetime.now( ).strftime("%y%m%d-%H%M%S")
    bucket_name = event['Records'][0]['s3']['bucket']['name']
    file_key = event['Records'][0]['s3']['object']['key']
    paths = file_key.split('/')
    if (paths[1] != "job" or len(paths) != 4):
        return 0
    filter_path ='/'.join(paths[0:len(paths)−1]) + '/'
    guid = paths[2]
        combined_path = 's3://' + bucket_name + '/bulk/export/' + guid
    bucket = s3.Bucket(bucket_name)
    objects = bucket.objects.filter(Prefix=filter_path, Delimiter='/')
        timestamp = pd.to_datetime('today').strftime('%Y-%m-%d-%H:%M:%S')
    csv_paths = [ ]
    for obj in objects:
        obj_path = 's3://' + obj.bucket_name +'/' + obj.key
        csv_paths.append(obj_path)
    likelihood_columns_split = ['risk_likelihood_id', 'risk_scenario_id', 'media_id', 'threat_action_id', 'threat_agent_id', 'threat_agent_type_id', 'vulnerability_id', 'max_likelihood_weight']
    impact_columns_split = ['risk_impact_id', 'risk_scenario_id', 'media_id', 'threat_action_id', 'threat_agent_id', 'threat_agent_type_id', 'vulnerability_id', 'max_impact_weight', 'importance_id']
    df = wr.s3.read_csv(csv_paths, escapechar='\\',dtype={"label": "string", "asset_ids": "string"})
        importance_dct = {118:1, 119:2, 120:3, 121:4, 122:5,36:3}
    df["importance_id"] = df["importance_id"].map(lambda x: importance_dct.get(int(x) if x > 0 else 0, 0))
    df.dropna(axis=0, how='any', inplace=True)
    # export impact
    df = df[df.importance_id != 0].reset_index(drop=True) #exclude records without an importance set for impact
    wr.s3.to_csv(df=df, path=combined_path+"/impact_all_"+timestamp+".csv", columns=impact_columns_split, index=False)
            df_magic_likelihood = split_controls(df.control_ids, df.control_response_ids, df.likelihood_weights)
        #if export likelihood
    likelihood_columns_split.extend(df_magic_likelihood.columns.to_list( ))
    wr.s3.to_csv(df=df, path=combined_path+"/likelihood_all_"+timestamp+".csv", columns=likelihood_columns_split, index=False)
```

Example 3—AWS® Lambda Script for Realtime Predictions

As previously noted and illustrated in FIG. 6, the AI Engine 72 can provide the user with real-time inference 82. In this example, the following lambda script was implemented to provide such real-time inference:

```
import os
import io
import boto3
import json
import pandas as pd
import numpy as np
import logging
runtime=boto3.client('runtime.sagemaker')
logger=logging.getLogger( )
def split_controls(df_controls, df_response_ids):
    control_ids=
[26,27,28,29,32,33,34,36,37,38,39,40,41,42,43,44,45,46,
47,48,49,50,51,52,53,56,57,58,60,61, 62,64,65,66,67,68,69,
70,71,72,73,74,75,76,77,78,79,80,81,83,84,85,86,87,88,89,
90,91,92,94, 95,96,97,98,99,100,101,102,103,105,106,107,
108,109,110,111,112,113,114,115,116,117,118,  119,120,
121,122,124,125,126,127,128,132,133,135,136,137,138,
139,140,141,154,155,156,15    7,158,159,160,161,162,163,
164,165,166,167,168,169,170,171,172,173,174,175,176,
177,178,   179,180,181,182,183,184,185,186,187,188,189,
190,191, 192, 193, 194, 195, 196, 197, 198, 199,20 0,202,
203,204,205,206,207,208,209,210,211,212,213,214,215,
216,217,224,229,243,239,244, 249,254,259]
    imp_map = {'na': 0, 'no': 1, 'in_progress': 2, 'yes': 3}
    maxlen = len(control_ids) # find max length in 'control_ids' column
    cols = ["control_"+str(x) for x in range(maxlen)] # create new column names
    c_rows = [ ]
    for index, value in df_controls.items( ):
        c_ids = value.split(",")
        cr_ids = df_response_ids[index].split(",")
        row_vals = [ ]
        for c_id in control_ids:
            val = 0
            for i, e in enumerate(c_ids):
                if int(e) == int(c_id):
                    val = imp_map[cr_ids[i]]
            row_vals.append(val)
        c_rows.append(row_vals)
    df_cr = pd.DataFrame(data=c_rows, columns=cols)
    return df_cr
def lambda_handler(event, context):
    likelihood_endpoint = os.environ['ENDPOINT_LIKELIHOOD']
    num_control_cols = 14
    likelihood_column = "likelihood_id"
    prediction_columns = ['risk_scenario_id', 'media_id', 'threat_id', 'threat_action_id',
        'threat_agent_id', 'threat_agent_type_id', 'vulnerability_id', 'importance_id']
    prediction_likelihood_columns = ['risk_scenario_id', 'media_id', 'threat_id',
'threat_action_id',
        'threat_agent_id', 'threat_agent_type_id', 'vulnerability_id'] #,
'max_likelihood_weight']
    prediction_impact_columns = ['risk_scenario_id', 'media_id', 'threat_id', 'threat_action_id',
        'threat_agent_id', 'threat_agent_type_id', 'vulnerability_id', 'max_impact_weight',
'importance_id']
    #prediction_impact_columns = ['max_impact_weight', 'importance_id']
    impact_endpoint = os.environ['ENDPOINT_IMPACT']
    impact_column = "impact_id"
    result_columns = ['location_id', 'customer_id', 'unique_media_id', 'risk_scenario_id',
        'component_group_risk_scenario_id', impact_column, likelihood_column, 'risk_rating']
    df = pd.json_normalize(event['data'])
    #logger.warning(df[prediction_columns].values)
    # cols_c = ["control_"+str(x) for x in range(num_control_cols)] # create new column names
    # datalist_c = list(map(lambda x: (
    # (str(x).split(",") + [0]*num_control_cols)[:num_control_cols]
    # ), df.control_ids)) # create list from entries in "control_ids"
    # df_c = pd.DataFrame(data=datalist_c, columns=cols_c).fillna(0).astype(int) # create dataframe of new columns
    # df = pd.concat([df, df_c], axis=1) # add it to original dataframe
    # prediction_columns.extend(cols_c) # add the new columns to the column filter
    # cols_cr = ["response_"+str(x) for x in range(num_control_cols)] # create new column names
    # datalist_cr = list(map(lambda x: (
    # (str(x).split(",") + [0]*num_control_cols)[:num_control_cols]
    # ), df.control_response_ids)) # create list from entries in "control_response_ids"
    # df_cr = pd.DataFrame(data=datalist_cr, columns=cols_cr).fillna(0).astype(int) # create dataframe of new columns
    # df = pd.concat([df, df_cr], axis=1) # add it to original dataframe
    # prediction_columns.extend(cols_cr) # add the new columns to the column filter
    df_magic = split_controls(df.control_ids, df.control_response_ids)
    df = pd.concat([df, df_magic], axis=1) # add it to original dataframe
    #prediction_impact_columns.extend(df_magic.columns.to_list( ))
    prediction_likelihood_columns.extend(df_magic.columns.to_list( ))
    # print(json.loads(df[prediction_impact_columns].to_json(orient="records")))
    # print(json.loads(df[prediction_likelihood_columns].to_json(orient="records")))
```

-continued

```
    dfi = predict(df[prediction_impact_columns], impact_endpoint, impact_column)
    dfl = predict(df[prediction_likelihood_columns], likelihood_endpoint, likelihood_column)
    # print(json.loads(dfi[['impact_id']].to_json(orient="records")))
    df["risk_rating"] = dfi[impact_column] * dfl[likelihood_column]
    df = pd.concat([df, dfl, dfi], axis=1)
    return json.loads(df[result_columns].to_json(orient="records"))
def predict(df, endpoint, column):
    response = runtime.invoke_endpoint(EndpointName=endpoint,
            ContentType='text/csv',
            Body=df.to_csv(index=False,header=False))
    response_csv = response['Body'].read( ).decode( );
    return pd.read_csv(io.StringIO(response_csv), names=[column])
```

This script was implemented any time a user changed its control responses 68, and the script processed the data into a format that the AI Engine 72 recognized. Similar to the script in Example 2, the script in this example also split the controls, provided data points for each control, and formatted the user's data into various columns that could be recognized by the AI Engine 72. After the data was processed by the AI Engine 72, this script returned predictions for the risk impact 102 and risk likelihood 105, and brought the predictions to a Sagemaker® Endpoint.

Example 4—AWS® Lambda Script for Bulk CSV Predictions

A Lambda script was developed and implemented by the system 5 to create bulk CSV predictions. In this example, the AI Engine 72 and model 75 had already been created, and the script was being utilized to output new data to the AI Engine 72 every 15 minutes. Whenever data was sent to this script, this lambda script reviewed the file then provided a prediction for each risk scenario (similar to the script in Example 3), as follows:

```
import os
import io
import boto3
import re
import awswrangler as wr
import json
import uuid
import logging
import pandas as pd
import urllib3
runtime=boto3.client('runtime.sagemaker')
http=urllib3.PoolManager( )
logger=logging.getLogger( )
def split_controls(df_controls, df_response_ids):
    control_ids=
[26,27,28,29,32,33,34,36,37,38,39,40,41,42,43,44,45,46,
47,48,49,50,51,52,53,56,57,58,60,61, 62,64,65,66,67,68,69,
70,71,72,73,74,75,76,77,78,79,80,81,83,84,85,86,87,88,89,
90,91,92,94, 95,96,97,98,99,100,101,102,103,105,106,107,
108,109,110,111,112,113,114,115,116,117,118,    119,120,
121,122,124,125,126,127,128,132,133,135,136,137,138,
139,140,141,154,155,156,15    7,158,159,160,161,162,163,
164,165,166,167,168,169,170,171,172,173,174,175,176,
177,178,    179,180,181,182,183,184,185,186,187,188,189,
190,191,192,193,194,195,196,197,198,199,20    0,202,203,
204,205,206,207,208,209,210,211,212,213,214,215,216,
217,224,229,243,239,244, 249,254,259]
    imp_map = {83: 0, 82: 1, 81: 2, 80: 3}
    maxlen = len(control_ids) # find max length in 'control_ids' column
    cols = ["control_"+str(x) for x in range(maxlen)] # create new column names
    c_rows = [ ]
    for index, value in df_controls.items( ):
        c_ids = value.split(",")
        cr_ids = list(map(int, df_response_ids[index].split(",")))
        row_vals = [ ]
        for c_id in control_ids:
            val = 0
            for i, e in enumerate(c_ids):
                if int(e) == int(c_id):
                    val = imp_map[cr_ids[i]]
            row_vals.append(val)
        c_rows.append(row_vals)
    df_cr = pd.DataFrame(data=c_rows, columns=cols)
    return df_cr
def get_env(file_path):
    p = re.compile('.*\/(?P<env>\w+)\/[\/]+$')
    if (m := p.match(file_path)) is not None:
        return m.group('env')
    print("Can't find the env for the csv file")
    return None
def notify_api(env, output_file):
    headers = {
        'Content-Type': 'application/json',
        'User-Agent': 'Mozilla/5.0 (Windows NT 10.0; Win64; x64; rv:83.0) Gecko/20100101 Firefox/83.0' }
    cw_url = 'software-api.clearwatercompliance.com'
    if env not in ["production", "staging", "fixes"]:
        headers['customer-code'] = env
```

```
        if env == "staging":
            cw_url = 'software-api-stage.clearwatercompliance.com'
        if env == "fixes":
            cw_url = 'software-api-fixes.clearwatercompliance.com'
        api_url = 'https://{ }/{ }?path={}'.format(
            cw_url,
            'api/predictive-risk-ratings/download',
            output_file )
        print(f'sending {output_file} file to {env} env via {api_url}')
        try:
            response = http.request('POST',
                        api_url,
                        headers=headers,
                        retries=False)
            if response.status != 200:
                raise
        except urllib3.exceptions.HTTPError as e:
            print('Error Sending Predictions:', e.reason)
        except:
            logger.error('Error Sending Predictions to %s at %s', env, api_url)
    def process_rows(env, df):
        likelihood_endpoint = os.environ['ENDPOINT_LIKELIHOOD']
        likelihood_column = "risk_likelihood"
        impact_endpoint = os.environ['ENDPOINT_IMPACT']
        impact_column = "risk_impact"
        prediction_impact_columns = ['risk_scenario_id', 'media_id', 'threat_id', 'threat_action_id',
                'threat_agent_id', 'threat_agent_type_id', 'vulnerability_id', 'max_impact_weight',
    'importance_id']
        prediction_columns = ['risk_scenario_id', 'media_id', 'threat_id', 'threat_action_id',
                'threat_agent_id', 'threat_agent_type_id', 'vulnerability_id', 'importance_id']
        orig_columns = ['location_id', 'customer_id', 'unique_media_id', 'risk_scenario_id',
                'component_group_risk_scenario_id']
        result_columns = ['location_id', 'customer_id', 'unique_media_id', 'risk_scenario_id',
                'component_group_risk_scenario_id', 'risk impact', 'risk_likelihood', 'risk_rating']
        num_control cols = 14
        prediction_likelihood_columns = ['risk_scenario_id', 'media_id', 'threat_id',
    'threat_action_id',
                'threat_agent_id', 'threat_agent_type_id', 'vulnerability_id']
        # cols = ["control_"+str(x) for x in range(num_control_cols)] # create new column
    names
        # datalist = list(map(lambda x: (
        # (str(x).split(",") + [0]*num_control_cols)[:num_control_cols]
        # ), df.control_ids)) # create list from entries in "control_ids"
        # df_c=pd.DataFrame(data=datalist, columns=cols).fillna(0) # create dataframe of new
    columns
        # df = pd.concat([df, df_c], axis=1) # add it to original dataframe
        # prediction_columns.extend(cols) # add the new columns to the column filter
        # cols = ["response_"+str(x) for x in range(num_control_cols)] # create new column
    names
        # datalist = list(map(lambda x: (
        # (str(x).split(",") + [0]*num_control_cols)[:num_control_cols]
        # ), df.control_response_ids)) # create list from entries in "control_response_ids"
        # df_r = pd.DataFrame(data=datalist, columns=cols).fillna(0) # create dataframe of new
    columns
        # df = pd.concat([df, df_r], axis=1) # add it to original dataframe
        # prediction_columns.extend(cols) # add the new columns to the column filter
        df_magic = split_controls(df.control_ids, df.control_response_ids).reset_index(drop=True)
        prediction_likelihood_columns.extend(df_magic.columns.to_list( ))
        df_w_controls = pd.concat([df.reset_index(drop=True), df_magic], axis=1)
        #logger.warning(df[impact_columnS].values)
        dfi = predict(df_w_controls[prediction_impact_columns], impact_endpoint,
    impact_column)
        dfl = predict(df_w_controls[prediction_likelihood_columns], likelihood_endpoint,
    likelihood_column)
        df_w_ratings = pd.concat([df_w_controls[orig_columns], dfi, dfl], axis=1)
        df_w_ratings["risk_rating"] = dfi[impact_column] * dfl[likelihood_column]
        output_path = "single/{ }/{ }.csv".format(env, uuid.uuid4( ).hex)
        full_path="s3://clearwater-prr-import/{ }".format(output_path)
        #logger.warning(df[result_columns].values)
        wr.s3.to_csv(df df_w_ratings[result_columns], path=full_path, index=False)
        notify_api(env, output_path)
    def lambda_handler(event, context):
        bucket_name = event['Records'][0]['s3']['bucket']['name']
        file_key = event['Records'][0]['s3']['object']['key']
        csv_path = "s3://" + bucket name + "/" + file_key
        env = get_env(csv_path)
        if env == None:
            logger.error('%s file not in an env directory!', csv_path, chunksize=100)
            return None
```

```
dfs = wr.s3.read_csv(csv_path, chunksize=10000, escapechar='\\', error_bad_lines=False)
for df in dfs:
    process_rows(env, df)
def predict(df, endpoint, column):
    response = runtime.invoke_endpoint(EndpointName=endpoint,
            ContentType='text/csv',
            Body=df.to_csv(index=False,header=False))
    response_csv = response['Body'].read( ).decode( );
    return pd.read_csv(io.StringIO(response_csv), names=[column]);
```

As noted above, this script exports a CSV file, then writes a response into a S3 bucket and passes the inference 82 to an endpoint where it tells the application 11 where the prediction is located. The prediction file then passes from the endpoint into the application 11 and the inference 82 is displayed to the user. In this example, the bulk lambda script was implemented every 15 minutes to verify whether any data or predictions in the model 75 had changed and needed to be updated.

It will be understood that the embodiments described herein are not limited in their application to the details of the teachings and descriptions set forth, or as illustrated in the accompanying figures. Rather, it will be understood that the present embodiments and alternatives, as described and claimed herein, are capable of being practiced or carried out in various ways.

Also, it is to be understood that words and phrases used herein are for the purpose of description and should not be regarded as limiting. The use herein of "including," "comprising," "e.g.," "containing," or "having" and variations of those words is meant to encompass the items listed thereafter, and equivalents of those, as well as additional items.

Accordingly, the foregoing descriptions of several embodiments and alternatives are meant to illustrate, rather than to serve as limits on the scope of what has been disclosed herein. The descriptions herein are not intended to be exhaustive, nor are they meant to limit the understanding of the embodiments to the precise forms disclosed. It will be understood by those having ordinary skill in the art that modifications and variations of these embodiments are reasonably possible in light of the above teachings and descriptions.

What is claimed is:

1. A method for analyzing a risk posed by a threat occurrence to a component group, the method comprising the steps of:
    (a) providing a list of data elements to a user via a user interface;
    (b) receiving and processing a selection of the data elements from the user via the user interface;
    (c) generating a risk impact and a risk likelihood posed by the threat occurrence to the component group based on the selection of the data elements from the user;
    (d) providing the risk impact and the risk likelihood to the user via the user interface;
    (e) generating a risk rating posed by the threat occurrence to the component group; and
    (f) receiving a selection of the risk impact and a selection of the risk likelihood from the user via the user interface, and generating a database comprising an acceptable minimum risk impact and an acceptable maximum risk impact for a plurality of risk scenarios based on the asset importance selected by the user.

2. The method of claim 1, further comprising, after performing step "e", providing the risk rating to the user via the user interface.

3. The method of claim 2, wherein the risk rating is equivalent to the risk impact multiplied by the risk rating.

4. The method of claim 3, wherein the risk impact is a number in a range from 1-5, the risk likelihood is a number in a range from 1-5, and the risk rating is a number in a range from 1-25.

5. The method of claim 1, wherein the data elements are chosen from the group consisting of asset importance, sensitive records, users, component groups, component properties, threat sources, threat events, vulnerabilities, security controls, and control responses.

6. The method of claim 1, further comprising, before performing step "a", generating a database consisting of selections of data elements provided by other users, selections of risk impacts provided by other users, selections of risk likelihoods provided by other users, vulnerabilities, threat events, and threat sources;
    wherein said generating the database step further comprises assigning the vulnerabilities to the threat events, assigning the threat events to the threat sources, and assigning threat sources to the component group.

7. The method of claim 6, wherein step "c" further comprises comparing the selection of the data elements from the user to similar selections of data elements provided by other users in the database.

8. The method of claim 1, wherein the database further comprises an acceptable minimum risk likelihood and an acceptable maximum risk likelihood for said plurality of risk scenarios based on the control responses selected by the user.

9. The method of claim 8, further comprising, after performing the step of receiving said selection of the risk impact and said selection of the risk likelihood and generating said database, comparing said selection of the risk impact to the acceptable minimum and maximum risk impact and excluding said selection of the risk impact when said selection falls outside of said acceptable minimum and maximum risk impact, and comparing said selection of the risk likelihood to the acceptable minimum and maximum risk likelihood and excluding said selection of the risk likelihood when said selection falls outside of said acceptable minimum and maximum risk likelihood.

10. A computer implemented method of analyzing a cybersecurity risk posed by a threat occurrence to a component group, the method comprising the steps of:
    (a) generating a database comprising a list of data elements wherein the data elements are chosen from the group consisting of asset importance, sensitive records, users, component groups, component properties, threat sources, threat events, vulnerabilities, security controls, and control responses, wherein the database further comprises selections of data elements provided by other users, selections of risk impacts provided by other users, and selections of risk likelihoods provided by other users, and assigning the vulnerabilities to the threat events, assigning the threat events to the threat sources, and assigning the threat sources to the component group;

(b) providing the list of data elements to a user via a user interface by retrieving the list of data elements from the database;

(c) receiving and processing a selection of the data elements from the user via the user interface and storing the selection of the data elements in the database;

(d) generating a risk impact and a risk likelihood posed by the threat occurrence to the component group based on the selection of the data elements from the user, and comparing the selection of the data elements from the user to similar selections of data elements provided by other users in the database;

(e) providing the risk impact and the risk likelihood to the user via the user interface;

(f) receiving a selection of the risk impact and a selection of the risk likelihood from the user via the user interface; and (g) generating a risk rating posed by the threat occurrence to the component group.

11. The method of claim 10, further comprising, after performing step "g", providing the risk rating to the user via the user interface.

12. The method of claim 11, wherein the risk rating is equivalent to the risk impact multiplied by the risk rating.

13. The method of claim 12, wherein the risk impact is a number in a range from 1-5, the risk likelihood is a number in a range from 1-5, and the risk rating is a number in a range from 1-25.

14. One or more non-transitory computer-readable media storing instructions, which, when executed by at least one processor, instruct the at least one processor to perform actions comprising:

(a) generating a database comprising a list of data elements wherein the data elements are chosen from the group consisting of asset importance, sensitive records, users, component groups, component properties, threat sources, threat events, vulnerabilities, security controls, and control responses, wherein said one or more non-transitory computer-readable media storing instructions further instruct the at least one processor to perform the action of generating the database consisting of selections of data elements provided by other users, selections of risk impacts provided by other users, and selections of risk likelihoods provided by other users, wherein said generating the database step further comprises assigning the vulnerabilities to the threat events, assigning the threat events to the threat sources, and assigning threat sources to the component group;

(b) providing the list of data elements to a user via a user interface by retrieving the list of data elements from the database;

(c) receiving and processing a selection of the data elements from the user via the user interface and storing the selection of the data elements in the database;

(d) generating a risk impact and a risk likelihood posed by the threat occurrence to the component group based on the selection of the data elements from the user, and comparing the selection of the data elements from the user to similar selections of data elements provided by other users in the database;

(e) providing the risk impact and the risk likelihood to the user via the user interface;

(f) receiving a selection of the risk impact and a selection of the risk likelihood from the user via the user interface; and (g) performing the step of generating a risk rating posed by the threat occurrence to the component group and providing said risk rating to the user via the user interface.

* * * * *